(12) United States Patent
Takahashi et al.

(10) Patent No.: US 7,817,519 B2
(45) Date of Patent: Oct. 19, 2010

(54) WRITE-ONCE READ-MANY INFORMATION RECORDING MEDIUM, INFORMATION RECORDING METHOD, INFORMATION REPRODUCTION METHOD, INFORMATION RECORDING APPARATUS, AND INFORMATION REPRODUCTION APPARATUS

(75) Inventors: Yoshihisa Takahashi, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 12/133,049

(22) Filed: Jun. 4, 2008

(65) Prior Publication Data

US 2008/0239912 A1 Oct. 2, 2008

Related U.S. Application Data

(63) Continuation of application No. 10/540,728, filed as application No. PCT/JP03/16057 on Dec. 15, 2003, now Pat. No. 7,428,202.

(30) Foreign Application Priority Data

Dec. 25, 2002 (JP) ............................. 2002-373532
Jul. 18, 2003 (JP) ............................. 2003-276843

(51) Int. Cl.
*G11B 7/24* (2006.01)
*G11B 5/09* (2006.01)

(52) U.S. Cl. ................. 369/53.24; 369/53.3; 369/53.41; 369/53.17; 369/47.1

(58) Field of Classification Search ....................... None
See application file for complete search history.

(56) References Cited

U.S. PATENT DOCUMENTS 6,243,338 B1 6/2001 Mine
(Continued)

FOREIGN PATENT DOCUMENTS

WO 2004/034396 A 4/2004
WO 2004/036561 A1 4/2004

OTHER PUBLICATIONS

International Search Report for corresponding Application No. PCT/JP2003/016057, mailed Jul. 30, 2004.
(Continued)

*Primary Examiner*—Muhammad N. Edun
(74) *Attorney, Agent, or Firm*—Renner, Otto, Boisselle & Sklar, LLP

(57) ABSTRACT

A write-once read-many information recording medium is provided, which is capable of easily searching for a latest DDS and a latest defect list. At least one disc management working area is sequentially allocated in a predetermined direction on the write-once read-many information recording medium of the present invention. The latest defect list and the latest DDS are provided in a recorded disc management working area neighboring a border between the recorded disc management working area and an unrecorded disc management working area, where the latest defect list precedes the latest DDS in the predetermined direction.

3 Claims, 24 Drawing Sheets

U.S. PATENT DOCUMENTS

| | | | |
|---|---|---|---|
| 6,564,345 | B1 | 5/2003 | Kang et al. |
| 6,894,960 | B2 | 5/2005 | Marumori et al. |
| 7,023,775 | B2 | 4/2006 | Ito et al. |
| 2002/0145966 | A1 | 10/2002 | Miyamoto et al. |

OTHER PUBLICATIONS

ECMA: "ECMA 260 Data interchange on 356mm optical disk cartridges—WORM, using phase-change technology capacity: 14.8 and 25 Gbytes per cartridge"; ECMA-International. Org.; Jun. 1997; pp. 77-82; XP002289009.

ECMA: "ECMA 238 Data interchange on 130mm optical disk cartridges—WORM, using irreversible effects—capacity 2,6 Gbytes per cartridge"; ECMA-International. Org.; Jun. 1996; pp. 54-61; XP002289010.

Notice of Reasons for Rejection for corresponding Japanese Application No. 2008-182568 issued May 18, 2010 with English translation.

FIG. 11
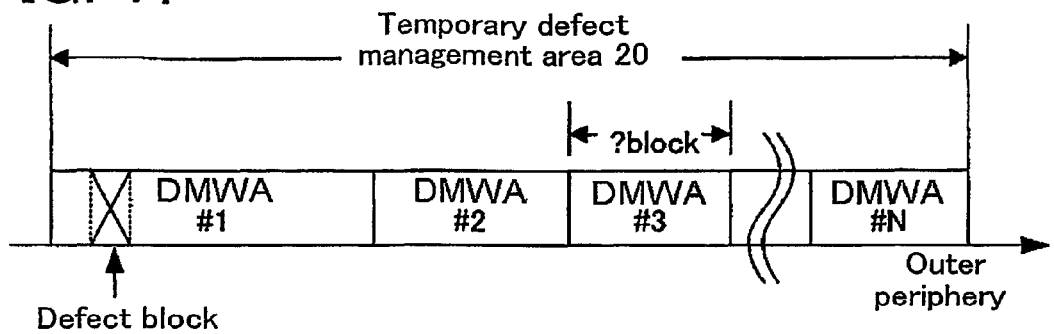
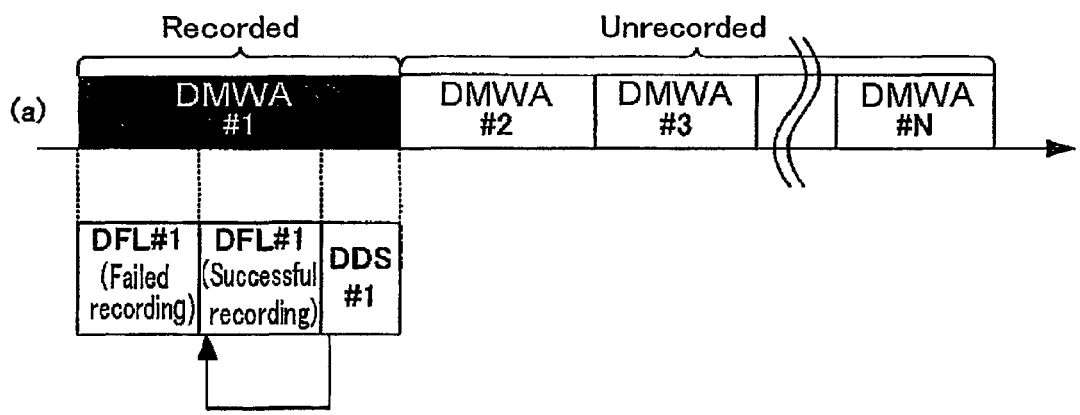
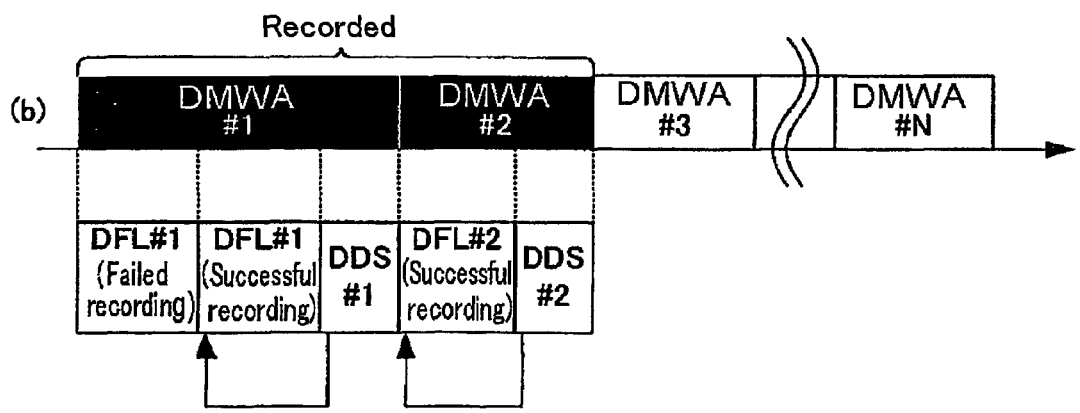

WRITE-ONCE READ-MANY INFORMATION RECORDING MEDIUM, INFORMATION RECORDING METHOD, INFORMATION REPRODUCTION METHOD, INFORMATION RECORDING APPARATUS, AND INFORMATION REPRODUCTION APPARATUS

This application is a continuation application of U.S. patent application Ser. No. 10/540,728 filed on May, 03, 2006 now U.S. Pat. No. 7,428,202, which is a §371 of International Application No. PCT/JP2003/016057 filed Dec. 15, 2003, the entire disclosures of which are incorporated herein by reference, and is related to co-pending sibling U.S. application Ser. No. 11/690,439 filed Mar. 23, 2007, U.S. application Ser. No. 11/690,530 filed Mar. 23, 2007, U.S. application Ser. No. 11/690,552 filed Mar. 23, 2007, and (U.S. application Ser. No. 12/132,962) and (U.S. application Ser. No. 12/133,001), both filed on Jun. 4, 2008.

TECHNICAL FIELD

The present invention relates to a write-once read-many information recording medium, an information recording method for recording information onto the write-once read-many information recording medium, an information reproduction method for reproducing information from the write-once read many information recording medium, an information recording apparatus for recording information onto the write-once read many information recording medium, and an information reproduction apparatus for reproducing information from the write-once read-many information recording medium.

BACKGROUND ART

Recently, large-capacity exchangeable information recording media, and disc drive apparatuses which handle large-capacity exchangeable information recording media, are widely used. As large-capacity exchangeable information recording media, optical discs (e.g., DVDs, etc.) are well known.

In optical disc drive apparatuses, information is recorded onto an optical disc by forming small pits thereon using laser light. Therefore, optical disc drive apparatuses are capable of recording large-capacity exchangeable information. Optical discs have a disadvantage of exchangeable information recording media that the recording surface is likely to suffer from defects, such as dust, scratches, or the like.

To cope with this problem, optical disc drive apparatuses have to perform defect management in order to secure the reliability of recorded or reproduced data.

In a conventional defect management technique, two defect management areas (DMA) are allocated at predetermined positions in each of the inner and outer peripheries of a rewritable optical disc (i.e., a total of four DMAs are provided). If defect management information is updated, new defect management information is rewritten into these defect management areas (e.g., Japanese Laid-Open Publication No. 5-006626).

FIG. 23 shows the data structure of a conventional rewritable optical disc 400.

A data area 5 contains a user data area 16 for recording/reproducing user data, and a spare area 17 for providing a block (hereinafter also referred to as "replacement block") which replaces a defect block present in the user data area 16. The spare area 17 is provided in advance.

A lead-in area 4 and a lead-out area 6 each contain defect management areas for recording information about a defect block present in the data area 5. The lead-in area 4 contains a first defect management area 10 (hereinafter also referred to as "DMA1") and a second defect management area 11 (hereinafter also referred to as "DMA2"). The lead-out area 6 contains a third defect management area 12 (hereinafter also referred to as "DMA3") and a fourth defect management area 13 (hereinafter also referred to as "DMA4").

Each of the DMA1 to the DMA4 has a predetermined position and a fixed length. Management information provided in each of the DMA1 to the DMA4 has a length which varies depending on the number of defect blocks, i.e., a variable length. Note that all of the DMA1 to the DMA4 have the same information, i.e., a multiple of pieces of the same information are stored on a disc. This is because defects may occur in the DMA1 to the DMA4 themselves. For example, if information cannot be reproduced from a DMA but information can be reproduced from any one of the DMA1 to the DMA4, the defect management information can be obtained.

The DMA1 to the DMA4 each contain a disc definition structure (hereinafter also referred to as "DDS") 14 and a defect list (hereinafter also referred to as "DFL") 15, where the DDS 14 precedes the DFL 15.

The DFL 15 contains a defect list header 32 and M defect entries 33 (M: an integer of 0 or more).

The defect list header 32 contains the number of the defect entries 33 contained in a DFL 15 and the like. The defect list header 32 is located at a predetermined position in the DFL 15 (e.g., the beginning of the DFL 15).

The defect entry 33 contains positional information about a defect block detected in the data area 5; replacement block positional information about a spare area which replaces the defect block; and the like.

The DDS 14 contains defect list beginning positional information indicating the position of the DFL 15, and the like.

The DMA1 to the DMA4 contained in the rewritable optical disc 400 are rewritable. Therefore, every time defect management information is updated, latest defect management information can be written over the DMA1 to the DMA4, i.e., updates can be performed. Thus, latest defect management information can be consistently recorded in the DMA1 to the DMA4 at the fixed positions.

FIG. 24 shows the structure of a conventional rewritable optical disc recording/reproduction apparatus 200.

The optical disc recording/reproduction apparatus 200 is connected via an I/O bus 170 to a higher level control apparatus (not shown). The higher level control apparatus is typically a host computer.

The optical disc recording/reproduction apparatus 200 comprises: a command processing section 110 for processing a command from the higher level control apparatus; a recording control section 120 for controlling recording of an optical disc; a reproduction control section 130 for controlling reproduction of an optical disc; a defect management information storage buffer 140 for storing contents reproduced from any one of the DMA1 to the DMA4; a data buffer 150 for temporarily storing recorded data and reproduced data; and a defect management information processing section 180 for performing processing relating to defect management information.

The defect management information processing section 180 comprises: a defect management information reading section 161 for detecting a normal defect management area from the DMA1 to the DMA4 and reading and transferring contents from the normal defect management area to the defect management information storage buffer 140; a defect management information updating section 164 for, when defect block information has been changed, updating the contents of the defect management information storage buffer 140 to create new defect information; a defect management information writing section 162 for writing the contents updated by the defect management information updating section 164 to the DMA1 to the DMA4; and a defect management information control memory 163 for storing an operational control state of the defect management information processing section 180.

However, information can be recorded into the DMA1 to the DMA4 of a write-once read-many information recording medium (write-once read-many optical disc) only once. Therefore, in the case of write-once read-many information recording media, it is not possible that latest defect management information is consistently recorded at a predetermined position in the DMA1 to the DMA4 as in rewritable information recording media (rewritable optical discs). Therefore, recording/reproduction apparatuses for rewritable information recording media cannot perform recording/reproduction on write-once read-many information recording media capable of defect management.

The present invention is provided to solve the above-described problems. An object of the present invention is to provide a write-once read-many information recording medium on which recording/reproduction can be performed by a recording/reproduction apparatus for rewritable information recording media; an information recording method for recording information onto the write-once read-many information recording medium; an information reproduction method for reproducing information from the write-once read-many information recording medium; an information recording apparatus for recording information onto the write-once read-many information recording medium; and an information reproduction apparatus for reproducing information from the write-once read-many information recording medium.

DISCLOSURE OF THE INVENTION

According to an aspect of the present invention, a write-once read-many information recording medium is provided, wherein: at least one disc management working area is sequentially allocated in a predetermined direction; in the at least one disc management working area, disc management information, which is management information about the write-once read-many information recording medium, and disc definition structure containing positional information about the disc management information, are provided; latest disc management information and latest disc definition structure are provided, wherein the latest disc management information precedes the latest disc definition structure in the predetermined direction; the latest disc management information is disc management information provided in a recorded disc management working area neighboring a border between the recorded disc management working area and an unrecorded disc management working area; the latest disc definition structure is a disc definition structure containing positional information about the latest disc management information; and the latest disc definition structure is provided at a predetermined position in the recorded disc management working area neighboring the border, the predetermined position being capable of being calculated based on the border as a reference.

In one embodiment of this invention, the disc management information has a variable size; and the disc definition structure has a fixed size.

In one embodiment of this invention, the write-once read-many information recording medium contains a data area for recording data and a spare area, the spare area being a replacement area for the data area; the disc management information contains a replacement list containing correspondence relationship information indicating a correspondence relationship between a replacement source area contained in the data area and a replacement destination area contained in the spare area; and the disc definition structure contains replacement list positional information which is positional information about the replacement list.

In one embodiment of this invention, the predetermined direction is a direction from an inner periphery to an outer periphery of the write-once read-many information recording medium; and the latest disc definition structure is provided at a predetermined position which is capable of being calculated based on an end of the recorded disc management working area neighboring the border as a reference.

In one embodiment of this invention, the predetermined direction is a direction from an outer periphery to an inner periphery of the write-once read-many information recording medium; and the latest disc definition structure is provided at a predetermined position which is capable of being calculated based on a beginning of the recorded disc management working area neighboring the border as a reference.

In one embodiment of this invention, the disc management working area contains a plurality of blocks; each of the plurality of blocks is a unit for recording/reproducing data; and the disc management information and the disc definition structure are provided in different blocks in the plurality of blocks.

In one embodiment of this invention, the disc management working area contains one or more blocks; each of the one or more blocks is a unit for recording/reproducing data; the disc management information and the disc definition structure shares at least one of the one or more blocks; and the disc definition structure is provided at a predetermined position in a predetermined block among blocks contained in the recorded disc management working area neighboring the border, the predetermined block being capable of being calculated based on the border as a reference.

In one embodiment of this invention, a finalization identifying flag is recorded in the write-once read-many information recording medium; and the finalization identifying flag indicates prohibition of additionally recording data into the at least one disc management working area.

In one embodiment of this invention, at least one of the disc definition structure and the disc management information contains the finalization identifying flag.

In one embodiment of this invention, the write-once read-many information recording medium contains at least one disc management area; in the at least one disc management area, the last disc management information and the last disc definition structure are provided; the last disc management information is the latest disc management information provided in the at least one disc management area; the last disc definition structure is a disc definition structure containing positional information about the last disc management information; and the last disc management information and the last disc definition structure are provided from a beginning of the at least one disc management area, wherein the last disc definition structure precedes the last disc management information in the direction from the inner periphery to the outer periphery of the write-once read-many information recording medium.

In one embodiment of this invention, the disc management working area contains a plurality of blocks; each of the plurality of blocks is a unit for recording/reproducing data; and the disc management information and the disc definition structure are provided in different blocks in the plurality of blocks.

In one embodiment of this invention, the disc management working area contains one or more blocks; each of the one or more blocks is a unit for recording/reproducing data; the disc management information and the disc definition structure shares at least one of the one or more blocks; and the disc definition structure is provided at a predetermined position in a predetermined block among blocks contained in the recorded disc management working area neighboring the border, the predetermined block being capable of being calculated based on the border as a reference.

In one embodiment of this invention, a finalization identifying flag is recorded in the write-once read-many information recording medium; and the finalization identifying flag indicates prohibition of additionally recording data into the at least one disc management working area.

In one embodiment of this invention, at least one of the disc definition structure and the disc management information contains the finalization identifying flag.

In one embodiment of this invention, the write-once read-many information recording medium contains at least one disc management area; in the at least one disc management area, the last disc management information and the last disc definition structure are provided; the last disc management information is the latest disc management information provided in the at least one disc management area; the last disc definition structure is a disc definition structure containing positional information about the last disc management information; and the last disc management information and the last disc definition structure are provided from a beginning of the at least one disc management area, wherein the last disc definition structure precedes the last disc management information in the direction from the inner periphery to the outer periphery of the write-once read-many information recording medium.

According to another aspect of the present invention, an information recording method for recording information onto a write-once read-many information recording medium, is provided, wherein at least one disc management working area is sequentially provided in a predetermined direction on the write-once read-many information recording medium, the information recording method comprising the steps of: (a) selecting an unrecorded disc management working area neighboring a border between a recorded disc management working area and the unrecorded disc management working area; (b) recording disc management information, which is management information about the write-once read-many information recording medium, into the unrecorded disc management working area neighboring the border; and (c) recording a disc definition structure containing positional information about the disc management information recorded in the step (b) into the unrecorded disc management working area neighboring the border, wherein the disc management information and the disc definition structure are provided in the predetermined direction, the disc management information preceding the disc definition structure in the predetermined direction, and the disc definition structure is provided at a predetermined position in the unrecorded disc management working area neighboring the border, the predetermined position being capable of being calculated based on the border as a reference.

In one embodiment of this invention, the disc management information has a variable size and the disc definition structure has a fixed size.

In one embodiment of this invention, the write-once read-many information recording medium contains a data area for recording data and a spare area, the spare area being a replacement area for the data area; the disc management information contains a replacement list containing correspondence relationship information indicating a correspondence relationship between a replacement source area contained in the data area and a replacement destination area contained in the spare area; and the disc definition structure contains replacement list positional information which is positional information about the replacement list.

In one embodiment of this invention, the predetermined direction is a direction from an inner periphery to an outer periphery of the write-once read-many information recording medium; and the disc definition structure containing the positional information about the disc management information recorded in the step (b) is provided at a predetermined position which is capable of being calculated based on an end of the unrecorded disc management working area neighboring the border as a reference.

In one embodiment of this invention, the predetermined direction is a direction from an outer periphery to an inner periphery of the write-once read-many information recording medium; and the disc definition structure containing the positional information about the disc management information recorded in the step (b) is provided at a predetermined position which is capable of being calculated based on a beginning of the unrecorded disc management working area neighboring the border as a reference.

In one embodiment of this invention, the step (b) further comprises determining whether or not the recording of the disc management information has been normally performed; the step (c) further comprise determining whether or not the recording of the disc definition structure has been normally performed; and the information recording method further comprises the step of: (d) repeatedly performing the step (b) until the recording of the disc management information is normally performed, and repeatedly performing the step (c) until the recording of the disc definition structure is normally performed.

In one embodiment of this invention, the step (b) further comprises determining whether or not the recording of the disc management information has been normally performed; the step (c) further comprises determining whether or not the recording of the disc definition structure has been normally performed; and the information recording method further comprises the step of: (d) repeatedly performing the step (b) until the recording of the disc management information is normally performed, and repeatedly performing the step (c) until the recording of the disc definition structure is normally performed.

According to another aspect of the present invention, an information reproduction method for reproducing information from a write-once read-many information recording medium, is provided, wherein: at least one disc management working area is sequentially allocated in a predetermined direction on the write-once read-many information recording medium; in the at least one disc management working area, disc management information, which is management information about the write-once read-many information recording medium, and disc definition structure containing positional information about the disc management information, are provided; latest disc management information and latest disc definition structure are provided in the predetermined direction, the latest disc management information preceding the latest disc definition structure in the predetermined direction; the latest disc management information is disc management information provided in a recorded disc management working area neighboring a border between the recorded disc management working area and an unrecorded disc management working area; the latest disc definition structure is a disc definition structure containing positional information about the latest disc management information; the latest disc definition structure is provided at a predetermined position in the recorded disc management working area neighboring the border, the predetermined position being capable of being calculated based on the border as a reference, the information reproduction method comprising the steps of: (a) searching for a position of the border to obtain border positional information indicating the position of the border; (b) reproducing the latest disc definition structure based on the border positional information; (c) obtaining positional information about the latest disc management information based on the latest disc definition structure; and (d) reproducing the disc management information based on the positional information about the latest disc management information.

In one embodiment of this invention, the disc management information has a variable size and the disc definition structure has a fixed size.

In one embodiment of this invention, the write-once read-many information recording medium contains a data area for recording data and a spare area, the spare area being a replacement area for the data area; the disc management information contains a replacement list containing correspondence relationship information indicating a correspondence relationship between a replacement source area contained in the data area and a replacement destination area contained in the spare area; and the disc definition structure contains replacement list positional information which is positional information about the replacement list.

In one embodiment of this invention, the predetermined direction is a direction from an inner periphery to an outer periphery of the write-once read-many information recording medium; and the latest disc definition structure is provided at a predetermined position which is capable of being calculated based on an end of the recorded disc management working area neighboring the border as a reference.

In one embodiment of this invention, the predetermined direction is a direction from an outer periphery to an inner periphery of the write-once read-many information recording medium; and the latest disc definition structure is provided at a predetermined position which is capable of being calculated based on a beginning of the recorded disc management working area neighboring the border as a reference.

According to another aspect of the present invention, an information recording apparatus for recording information onto a write-once read-many information recording medium, is provided, wherein at least one disc management working area is sequentially provided in a predetermined direction on the write-once read-many information recording medium, the information recording apparatus comprising: (a) a section for selecting an unrecorded disc management working area neighboring a border between a recorded disc management working area and the unrecorded disc management working area; (b) a section for recording disc management information, which is management information about the write-once read-many information recording medium, into the unrecorded disc management working area neighboring the border; (c) a section for recording a disc definition structure containing positional information about the disc management information recorded in the step (b) into the unrecorded disc management working area neighboring the border, wherein the disc management information and the disc definition structure are provided in the predetermined direction, the disc management information preceding the disc definition structure in the predetermined direction, and the disc definition structure is provided at a predetermined position in the unrecorded disc management working area neighboring the border, the predetermined position being capable of being calculated based on the border as a reference.

In one embodiment of this invention, the disc management information has a variable size and the disc definition structure has a fixed size.

In one embodiment of this invention, the write-once read-many information recording medium contains a data area for recording data and a spare area, the spare area being a replacement area for the data area; the disc management information contains a replacement list containing correspondence relationship information indicating a correspondence relationship between a replacement source area contained in the data area and a replacement destination area contained in the spare area; and the disc definition structure contains replacement list positional information which is positional information about the replacement list.

In one embodiment of this invention, the predetermined direction is a direction from an inner periphery to an outer periphery of the write-once read-many information recording medium; and the disc definition structure containing the positional information about the disc management information recorded by the section (b) is provided at a predetermined position which is capable of being calculated based on an end of the unrecorded disc management working area neighboring the border as a reference.

In one embodiment of this invention, the predetermined direction is a direction from an outer periphery to an inner periphery of the write-once read-many information recording medium; and the disc definition structure containing the positional information about the disc management information recorded by the section (b) is provided at a predetermined position which is capable of being calculated based on a beginning of the unrecorded disc management working area neighboring the border as a reference.

In one embodiment of this invention, the section (b) further comprises a section for determining whether or not the recording of the disc management information has been normally performed; the section (c) further comprise a section for determining whether or not the recording of the disc definition structure has been normally performed; and the information recording apparatus further comprises: (d) a section for repeatedly performing recording of the disc management information until the recording of the disc management information is normally performed, and repeatedly performing recording of the disc definition structure until the recording of the disc definition structure is normally performed.

In one embodiment of this invention, the section (b) further comprises a section for determining whether or not the recording of the disc management information has been normally performed; the section (c) further comprises a section for determining whether or not the recording of the disc definition structure has been normally performed; and the information recording apparatus further comprises: (d) a section for repeatedly performing recording of the disc management information until the recording of the disc management information is normally performed, and repeatedly performing recording of the disc definition structure until the recording of the disc definition structure is normally performed.

According to another aspect of the present invention, an information reproduction apparatus for reproducing information from a write-once read-many information recording medium, is provide, wherein: at least one disc management working area is sequentially allocated in a predetermined direction on the write-once read-many information recording medium; in the at least one disc management working area, disc management information, which is management information about the write-once read-many information recording medium, and disc definition structure containing positional information about the disc management information, are provided; latest disc management information and latest disc definition structure are provided in the predetermined direction, the latest disc management information preceding the latest disc definition structure in the predetermined direction; the latest disc management information is disc management information provided in a recorded disc management working area neighboring a border between the recorded disc management working area and an unrecorded disc management working area; the latest disc definition structure is a disc definition structure containing positional information about the latest disc management information; the latest disc definition structure is provided at a predetermined position in the recorded disc management working area neighboring the border, the predetermined position being capable of being calculated based on the border as a reference, the information reproduction apparatus comprising: (a) a section for searching for a position of the border to obtain border positional information indicating the position of the border; (b) a section for reproducing the latest disc definition structure based on the border positional information; (c) a section for obtaining positional information about the latest disc management information based on the latest disc definition structure; and (d) a section for reproducing the disc management information based on the positional information about the latest disc management information.

In one embodiment of this invention, the disc management information has a variable size and the disc definition structure has a fixed size.

In one embodiment of this invention, the write-once read-many information recording medium contains a data area for recording data and a spare area, the spare area being a replacement area for the data area; the disc management information contains a replacement list containing correspondence relationship information indicating a correspondence relationship between a replacement source area contained in the data area and a replacement destination area contained in the spare area; and the disc definition structure contains replacement list positional information which is positional information about the replacement list.

In one embodiment of this invention, the predetermined direction is a direction from an inner periphery to an outer periphery of the write-once read-many information recording medium; and the latest disc definition structure is provided at a predetermined position which is capable of being calculated based on an end of the recorded disc management working area neighboring the border as a reference.

In one embodiment of this invention, the predetermined direction is a direction from an outer periphery to an inner periphery of the write-once read-many information recording medium; and the latest disc definition structure is provided at a predetermined position which is capable of being calculated based on a beginning of the recorded disc management working area neighboring the border as a reference.

BRIEF DESCRIPTION OF THE DRAWINGS

FIG. 11 is a diagram showing a state in which a defect list and a DDS are additionally recorded into a defect management working area in accordance with the procedure described with reference to FIG. 10.

BEST MODE FOR CARRYING OUT THE INVENTION

Hereinafter, the present invention will be described by way of illustrative embodiments with reference to the accompanying drawings.

In the embodiments below, a write-once read-many information recording medium (hereinafter also referred to as "write-once read-many optical disc") is employed.

EMBODIMENT 1

1.1. Data Structure of Write-Once Read-Many Optical Disc

Figure 1:
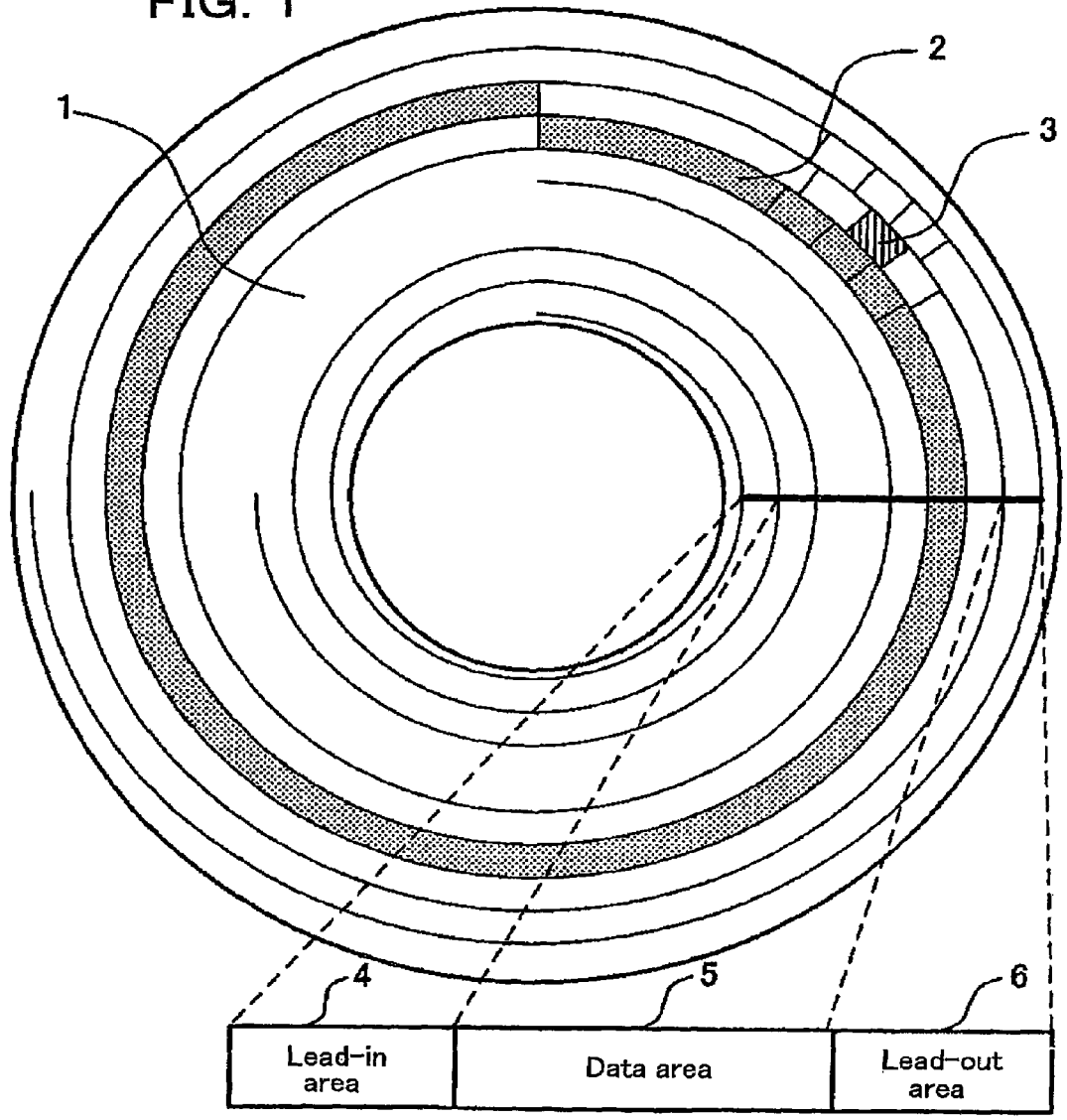
FIG. 1 is a diagram showing an arrangement of areas in a write-once read-many optical disc according to Embodiment 1 of the present invention.

FIG. 1 shows an arrangement of areas in a write-once read-many optical disc 1 according to Embodiment 1 of the present invention. A number of tracks 2 are spirally formed on the disc-like write-once read-many optical disc 1. Each track 2 is subdivided into a number of blocks 3. A block 3 is a unit for error correction, which is a minimum unit for recording or reproduction operations. For example, in the case of DVD-RAM using red laser the size of a block 3 is 1 ECC (32 KBytes) while in the case of large-capacity BD-RE using blue laser the size of a block 3 is 1 cluster (64 KBytes).

A lead-in area 4, a data area 5, and a lead-out area 6 are allocated on the write-once read-many optical disc 1. User data is recorded into or reproduced from the data area 5. The lead-in area 4 and the lead-out area 6 function as a margin with which even if an optical head (not shown) accesses but overruns an end of the data area 5, the optical head can follow a designated track.

Figure 2:
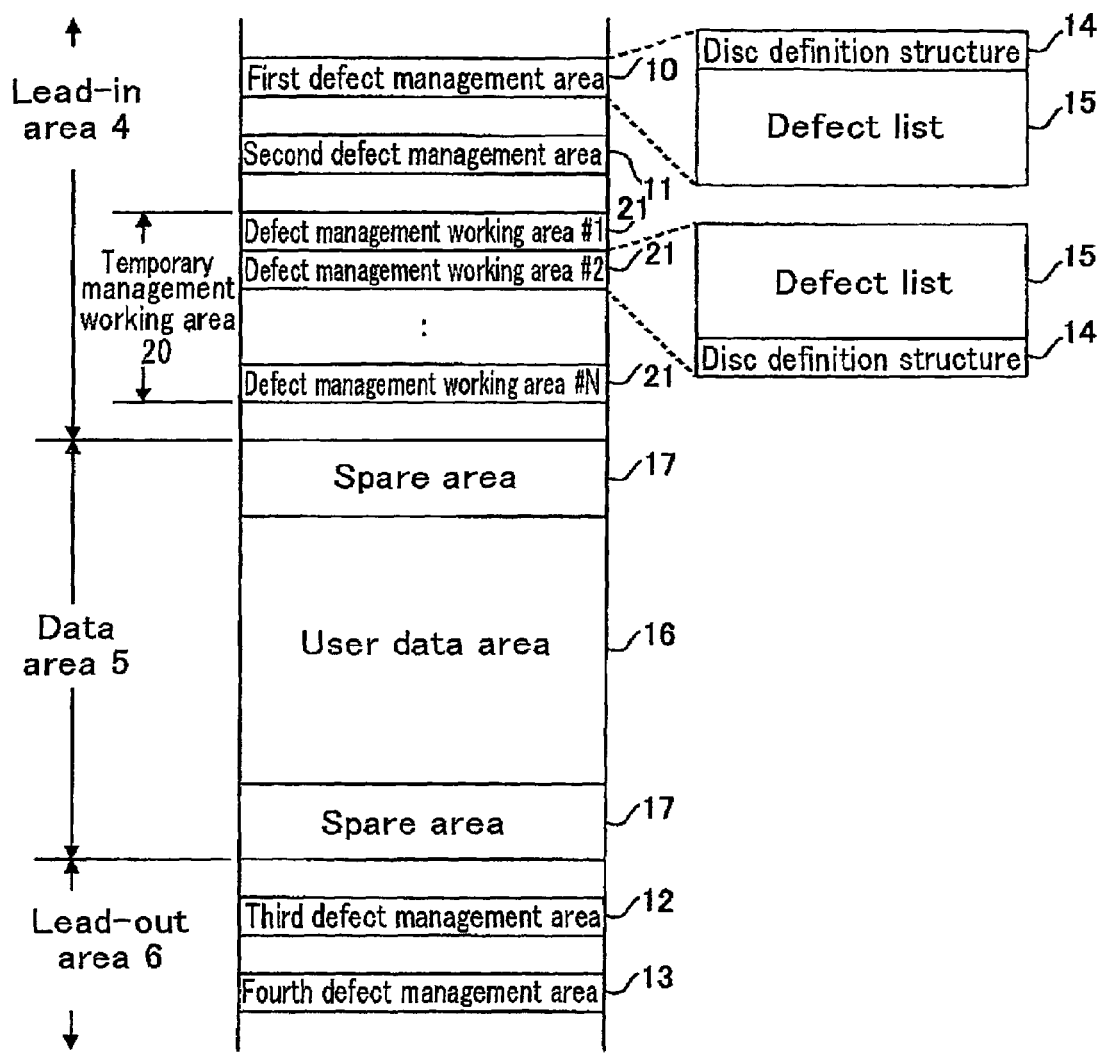
FIG. 2 is a diagram showing a data structure of a write-once read-many optical disc according to Embodiment 1 of the present invention.

FIG. 2 shows a data structure of the write-once read-many optical disc 1 according to Embodiment 1 of the present invention.

A reason the write-once read-many optical disc 1 are roughly divided into the lead-in area 4, the data area 5 and the lead-out area 6.

The lead-in area 4 contains a first defect management area 10 (hereinafter also referred to as "DMA1") and a second defect management area 11 (hereinafter also referred to as "DMA2"), and a temporary defect management area 20.

The DMA1 and the DMA2 are used for management of information or the like in defect blocks of the data area 5.

The data area 5 is used for recording of data, containing a user data area 16 and a spare area 17.

The user data area 16 is a write-once read-many area into which any information, such as real time data (e.g., music, video, etc.), computer data (e.g., documents, databases, etc.), or the like, can be recorded by the user.

The spare area 17 is a replacement area for the data area 5. For example, when a defect block is detected in the user data area 16, data is recorded into a replacement area instead of the defect block. In the data structure of the write-once read-many optical disc 1 of FIG. 2, a spare area 17 is provided in each of the inner (i.e., closer to the lead-in area 4) and outer (i.e., closer to the lead-out area 6) peripheries of the data area 5. However, the number of spare areas 17 or the positions of spare areas 17 may be arbitrarily determined but not limited to the number of spare areas or the positions of spare areas shown in FIG. 2.

The lead-out area 6 contains a third defect management area 12 (hereinafter also referred to as "DMA3") and a fourth defect management area 13 (hereinafter also referred to as "DMA4").

The DMA3 and the DMA4 are areas for managing information about a defect block in the data area 5 or the like.

Each of the DMA1 to the DMA4 has a predetermined position and a fixed length. Management information provided in each of the DMA1 to the DMA4 has a variable length which varies depending on the number of defect blocks.

Each of the DMA1 to the DMA4 contains a disc definition structure (hereinafter also referred to as "DDS") 14 and a defect list (hereinafter also referred to as "DFL") 15, where the DDS 14 precedes the DFL 15.

The temporary defect management area 20 contains N defect management working areas (hereinafter also referred to as "DMWA") 21, where N is an integer of 1 or more.

The defect management working area 21 is used for temporarily recording defect management information which has been updated before the write-once read-many optical disc 1 is finalized. The defect management working area 21 contains a DDS 14 and a defect list 15, where the defect list 15 precedes the DDS 14. The defect management working area 21 contains at least one block. A block is a unit for recording/reproducing data.

As used herein, the term "finalize a write-once read-many optical disc" means that the state of a write-once read-many optical disc is changed from a write-once read-many state to a non-write-once read-many state. For example, by recording the contents of the latest defect management working area 21 to the DMA1 to the DMA4, a data structure of the write-once read-many optical disc 1 can be changed to a data structure which is compatible with a data structure of a rewritable optical disc, i.e., the write-once read-many optical disc 1 is changed from a write-once read-many state to a non-write-once read-many state. Finalization will be described in detail below.

At least one defeat management working area 21 (DMWA#1 to DMWA#N (N: an integer of 1 or more)) is sequentially allocated from the beginning toward the end of the temporary defect management area 20 (i.e., in the direction of from the inner periphery to the outer periphery of the write-once read-many optical disc 1). Defect information is recorded sequentially from a defect management working area 21 at the beginning of the temporary defect management area 20 (closer to the inner periphery of the write-once read-many optical disc 1). In each defect management working area 21, a defect list 15 and a DDS 14 are provided in the direction from the beginning to the end of the temporary defect management area 20 (the direction from the inner periphery to the outer periphery of the write-once read-many optical disc 1), where the defect list 15 precedes the DDS 14. In other words, a DDS 14 and a defect list 15 are provided in each defect management working area 21 in reverse order with respect to each of the DMA1 to the DMA4.

Note that the temporary defect management area 20 containing defect management working areas 21 may not be necessarily contained in the lead-in area 4. The temporary defect management area 20 may be contained in, for example, the lead-out area 6 or the spare area 17 excluding the user data area 16.

For example, a DDS 14 is located in a recorded defect management working area neighboring a border between the recorded defect management working area and an unrecorded defect management working area. The DDS 14 is located at a predetermined position in a recorded defect management working area neighboring the border, and the predetermined position can be calculated based on the border. In Embodiment 1 of the present invention, it is assumed that a DDS 14 is located at the end of a recorded defect management working area neighboring a border between the recorded defect management working area and an unrecorded defect management working area.

Note that the position of a DDS 14 is not limited to the end of a defect management working area. A DDS 14 may be located at a predetermined position which can be calculated from a reference, i.e., the end (border) of a recorded defect management working area neighboring a border between the recorded defect management working area and an unrecorded defect management working area.

Figure 3:
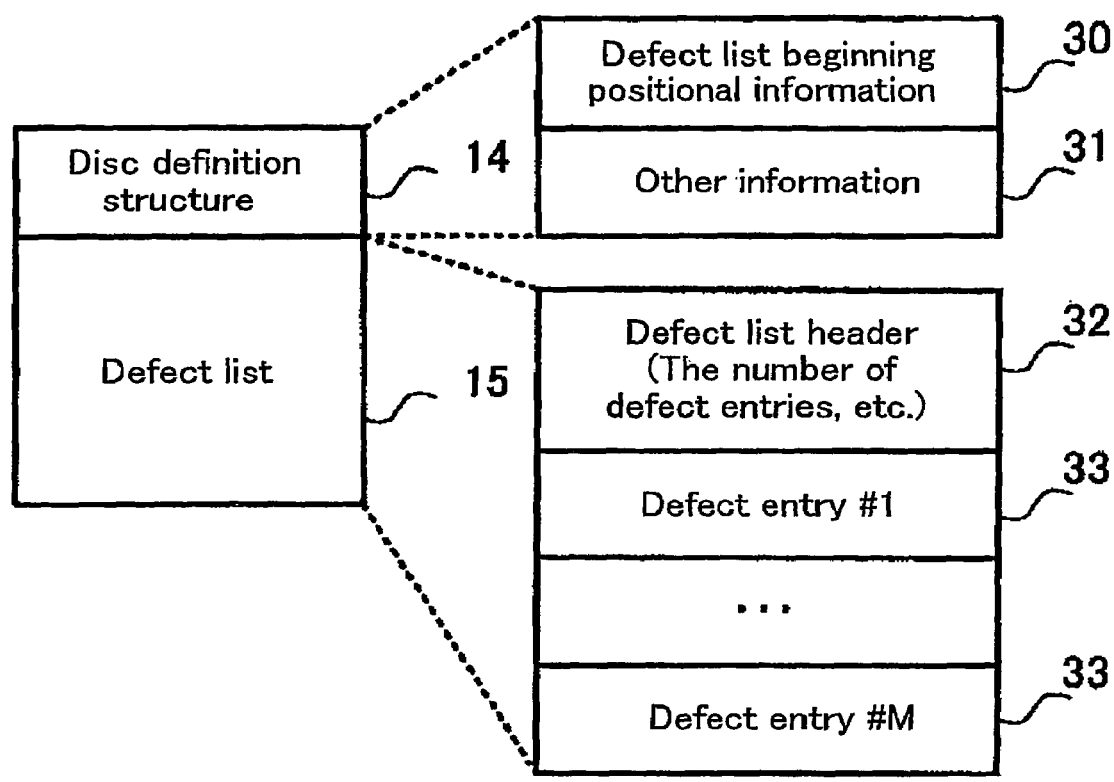
FIG. 3 is a diagram showing data structures of a DDS and a defect list.

FIG. 3 shows data structures of a DDS 14 and a defect list 15.

A DDS 14 contains positional information about a defect list 15. For example, the DDS 14 contains a defect list beginning positional information 30 indicating a beginning position at which the defect list 15 is located and other information 31. For example, the defect list beginning positional information 30 is herein a sector address which is positional information about a sector (1 sector has a size of 2 KBytes) which is the smallest addressable unit.

A DDS 14 has a fixed length which is, for example, the size of 1 block. In Embodiment 1 of the present invention, it is assumed that a DDS 14 has a size of 1 block. Note that a DDS 14 may not necessarily have a fixed length if the position of information indicating the position of a defect list 15 (i.e., the defect list beginning positional information 30) can be calculated based on a reference, i.e., a border between a recorded defect management working area and an unrecorded defect management working area. This is because the positions of defect lists can be calculated from the border as a reference.

A defect list 15 contains a defect list header 32 and M defect entries 33 (M: an integer of 0 or more).

The defect list 15 may further contain information indicating an anchor indicating the end of defect management information in addition to the defect list header 32 and the defect entry 33.

The defect list header 32 contains the number of defect entries 33 contained in a defect list, or the like.

The defect entry 33 contains correspondence relationship information indicating a correspondence relationship between an area in a data area (replacement source) and an area in a spare area (replacement destination). The defect entry 33 contains, for example, positional information about a defect block detected in the user data area 16 and replacement block positional information about the spare area 17 which contains a replacement destination of the defect block.

A defect list 15 has a variable length which depends on the number of defect entries 33 registered in the defect list 15. Specifically, the sizes of the defect management working area #1 to the defect management working area #N are not necessarily the same (see FIG. 2).

1.2. Configuration of an Optical Disc Recording/Reproduction Apparatus 100

Figure 4:
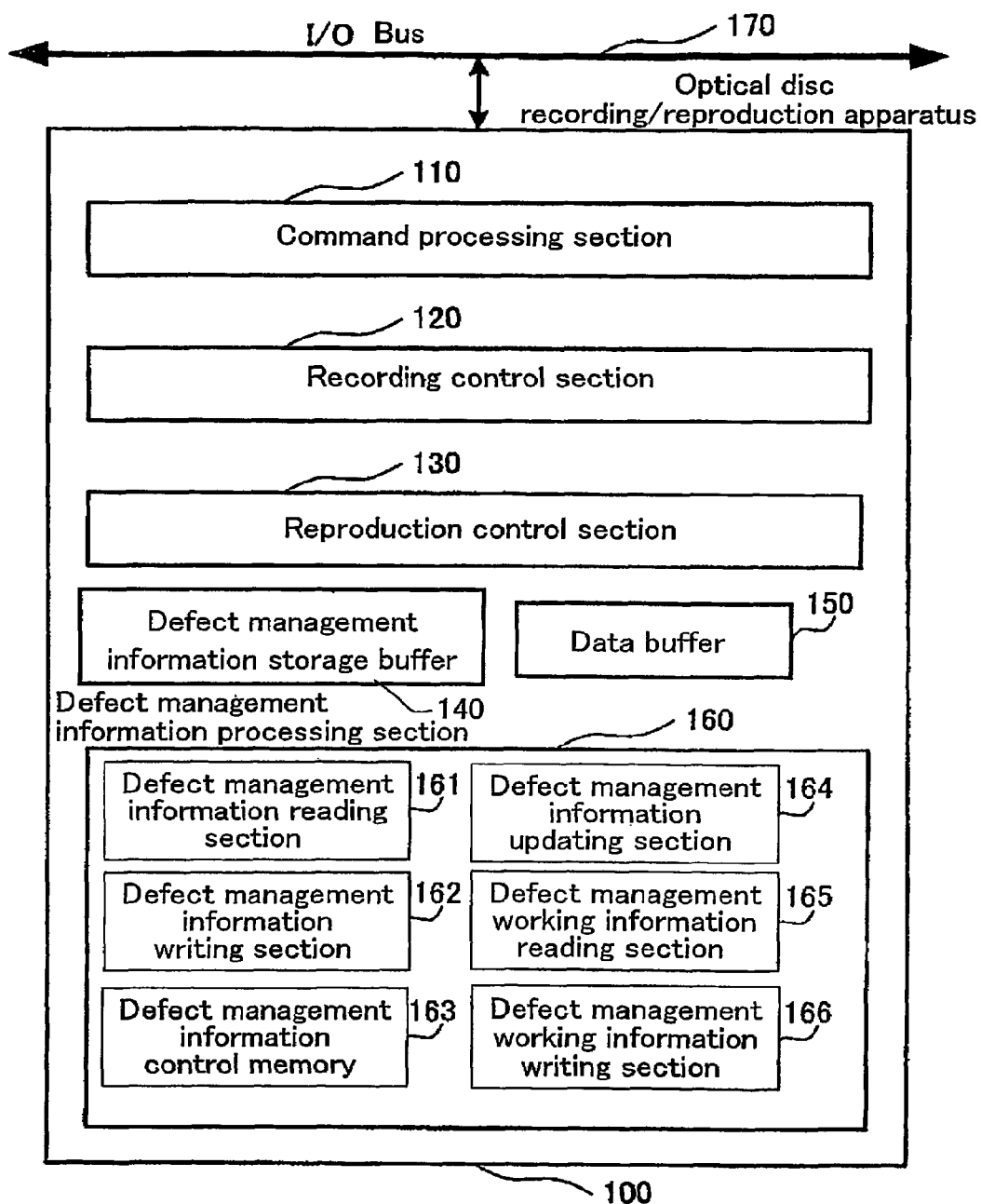
FIG. 4 is a diagram showing a configuration of an optical disc recording/reproduction apparatus according to Embodiment 1 of the present invention.

FIG. 4 shows a configuration of an optical disc recording/reproduction apparatus 100 according to Embodiment 1 of the present invention.

The optical disc recording/reproduction apparatus 100 is connected via an I/O bus 170 to a higher level control apparatus (not shown). The higher level control apparatus is, for example, a host computer.

The optical disc recording/reproduction apparatus 100 comprises: a command processing section 110 for processing a command from the higher level control apparatus; a recording control section 120 for controlling recording of a write-once read-many optical disc 1; a reproduction control section 130 for controlling reproduction of an optical disc; a defect management information storage buffer 140 for storing contents reproduced from any one of the DMA1 to the DMA4 or contents reproduced from a defect management working area 21; a data buffer 150 for temporarily storing recorded data and reproduced data; and a defect management information processing section 160 for performing processing relating to defect management information.

The defect management information processing section 160 comprises a defect management information reading section 161, a defect management information writing section 162, a defect management information control memory 163, a defect management information updating section 164, a defect management working information reading section 165, and a defect management working information writing section 166.

The defect management information reading section 161 detects a normal defect management area from the DMA1 to the DMA4 and reads and transfers contents from the defect management area to the defect management information storage buffer 140.

The defect management information reading section 161 further reads out data from one of a plurality of defect management areas allocated on the write-once read-many optical disc 1, determines whether or not the defect management area has been recorded, and based on the result of determination, determines whether or not the write-once read-many optical disc 1 has been changed from a write-once read-many state to a non-write-once read-many state.

For example, the defect management information reading section 161 reads out data from at least one of the DMA1 to the DMA4. If the write-once read-many optical disc 1 can be normally reproduced, it is determined that the write-once read-many optical disc 1 has been finalized. If all of the DMA1 to the DMA4 are unrecorded and data cannot be normally reproduced from these defect management areas, it is determined that the write-once read-many optical disc 1 has not been finalized.

If defect block information is changed or the like, the defect management information updating section 164 updates the contents of the defect management information storage buffer 140 to create new defect management information.

The defect management information writing section 162 writes the contents updated by the defect management information updating section 164 to the DMA1 to the DMA4. In other words, the defect management information writing section 162 records defect management information to the DMA1 to the DMA4 for finalization.

The defect management information control memory 163 stores an operational control state of the defect management information processing section 160.

The defect management working information reading section 165 searches the defect management working areas 21 contained in the temporary defect management area 20 for the latest recorded defect management working area 21. Contents recorded in the latest defect management working area 21 are read out to the defect management information storage buffer 140.

Note that the defect management information reading section 161 reads out data from each of the DMA1 to the DMA4 and determines whether or not the write-once read-many optical disc 1 has been finalized. Alternatively, the defect management working information reading section 165 can determine whether or not the write-once read-many optical disc 1 has been finalized. For example, the defect management working information reading section 165 determines whether or not the write-once read-many optical disc 1 has been finalized, based on whether or not a finalization identifying flag is recorded at a predetermined position in a defect management working area 21. The finalization identifying flag indicates that additional recording of data to at least one defect management working area 21 is prohibited.

Note that the recording position of the finalization identifying flag is not limited to a predetermined position in a defect management working area 21. The finalization identifying flag may be recorded at a predetermined position in the write-once read-many optical disc 1.

For example, the finalization identifying flag may be recorded in at least one of the disc definition structure 14 and the defect list 15. If the defect management working information reading section 165 reads out the finalization identifying flag recorded in at least one of the disc definition structure 14 and the defect list 15, it is determined that the write-once read-many optical disc 1 has been finalized.

The defeat management working information writing section 166 writes contents updated by the defect management information updating section 164 to an available defect management working area 21. In addition, the finalization identifying flag can be written to the defect management working area 21. For example, the defect management working information writing section 166 records the finalization identifying flag to at least one of the disc definition structure 14 and a defect list 15.

1.3. Obtaining the Latest Defect Management Information

Hereinafter, a method for obtaining (reproducing) information recorded on the write-once read-many optical disc 1 according to Embodiment 1 of the present invention (the latest defect list and the latest DDS recorded in a defect management working area neighboring a border between the recorded defect management working area and an unrecorded defect management working area) will be described.

Figure 5:
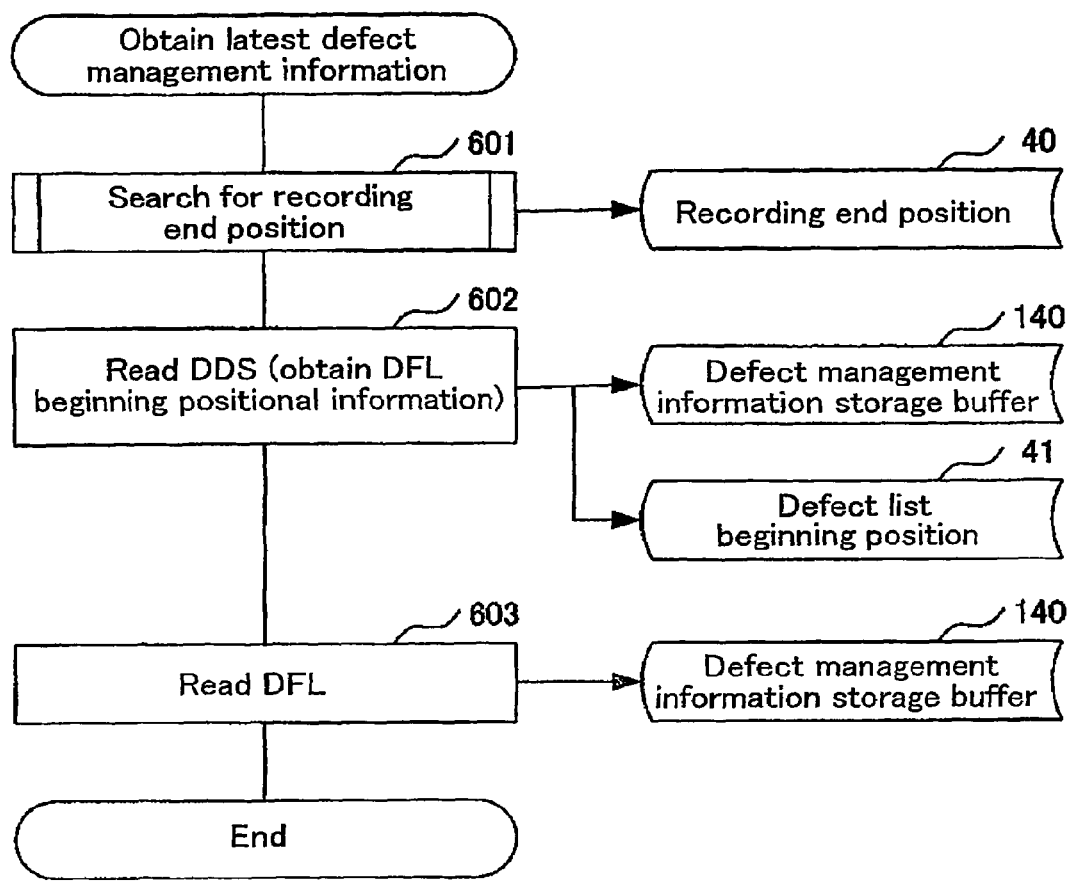
FIG. 5 is a flowchart of a procedure for obtaining the latest defect list and the latest DDS from a recorded defect management working area neighboring a border between the recorded defect management working area and an unrecorded defect management working area in a write-once read-many optical disc according to Embodiment 1 of the present invention.

FIG. 5 shows a procedure for obtaining the latest defect list 15 and the latest DDS 14 from a recorded defect management working area neighboring a border between the recorded defect management working area and an unrecorded defect management working area in the write-once read-many optical disc 1 according to Embodiment 1 of the present invention. Hereinafter, such a procedure will be described step by step with reference to FIG. 5.

Step 601: the defect management working information reading section 165 searches for the position of a border between a recorded defect management working area and an unrecorded defect management working area and obtains border positional information indicating the position of the border.

For example, the defect management working information reading section 165 searches for the end position of recorded areas (hereinafter also referred to as "recording end position") in the temporary defect management area 20 and stores the position of a defect management working area 21 at the end position in a recording end position 40 of the defect management information control memory 163. For, example, the position of a defect management working area 21 is herein a sector address which is positional information about a sector located at a recording end position. After the position of the defect management working area 21 at the detected recording end is stored, the process goes to step 602. Note that the search for the recording end position will be described in detail below.

Step 602: the defect management working information reading section 165 reproduces the latest DDS 14 based on the border positional information, and based on the latest DDS 14, obtains positional information about the latest defect list 15.

For example, the defect management working information reading section 165 reads out the latest DDS 14 having a size of 1 block which ends at a recording end position 40 to the defect management information storage buffer 140 and stores the defect list beginning positional information 30 contained in the latest DDS 14 at a defect list beginning position 41 in the defect management information control memory 163. After the latest DDS 14 is read out and the defect list beginning positional information 30 is stored, the process goes to step 603.

Step 603: the latest defect list 15 is reproduced based on positional information about the latest defect list 15.

For example, the defect management working information reading section 165 reads the latest defect list 15 located whose beginning is the defect list beginning position 41 to the defect management information storage buffer 140. After the latest defect list 15 is read out, the process is ended.

In this case, if the recording end position 40 indicates that no temporary defect management area 20 is recorded, reading in steps 602 and 603 is not required. Instead of reading, a DDS 14 and a defect list 15 may be previously stored in the defect management information storage buffer 140. Note that the stored DDS 14 contains the defect list beginning positional information 30 which has been initialized to a predetermined value, and in the stored defect list 15, the number of defect entries in the defect list header 32 has been initialized (the number of defect entries=0), i.e., the stored defect list 15 has no defect entry 33.

Note that the size of a defect list 15 to be read out may be calculated based on the number of defect entries contained in the defect list header located at the beginning of the defect list 15, or may be calculated by subtracting the beginning position of a DDS 14 from the defect list beginning position.

Figure 6:
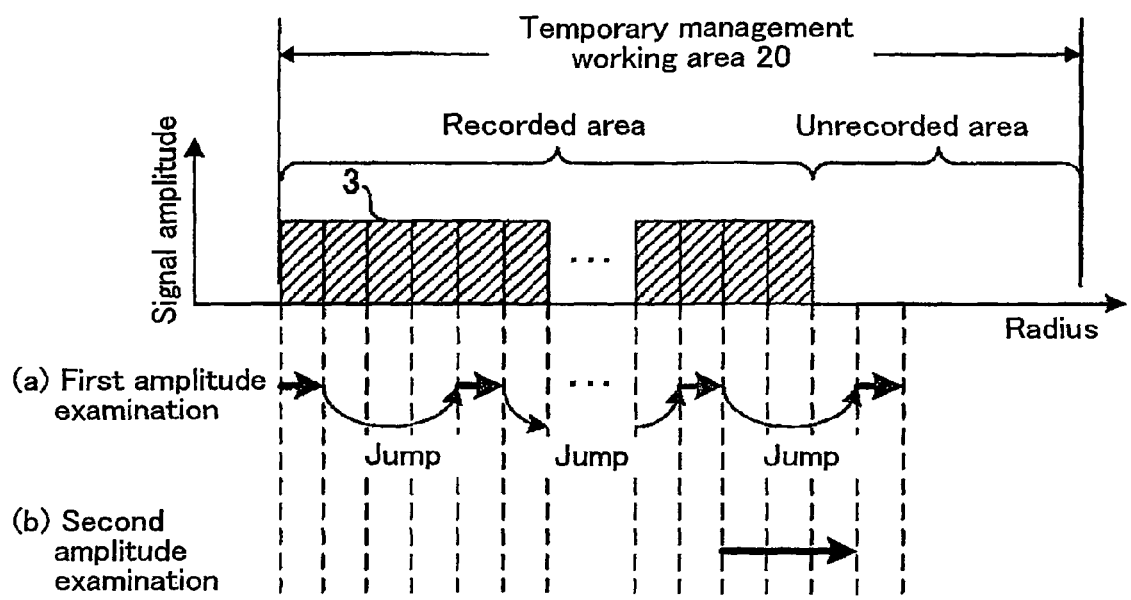
FIG. 6 is a diagram showing a process for searching for a recording end position.
Figure 7:
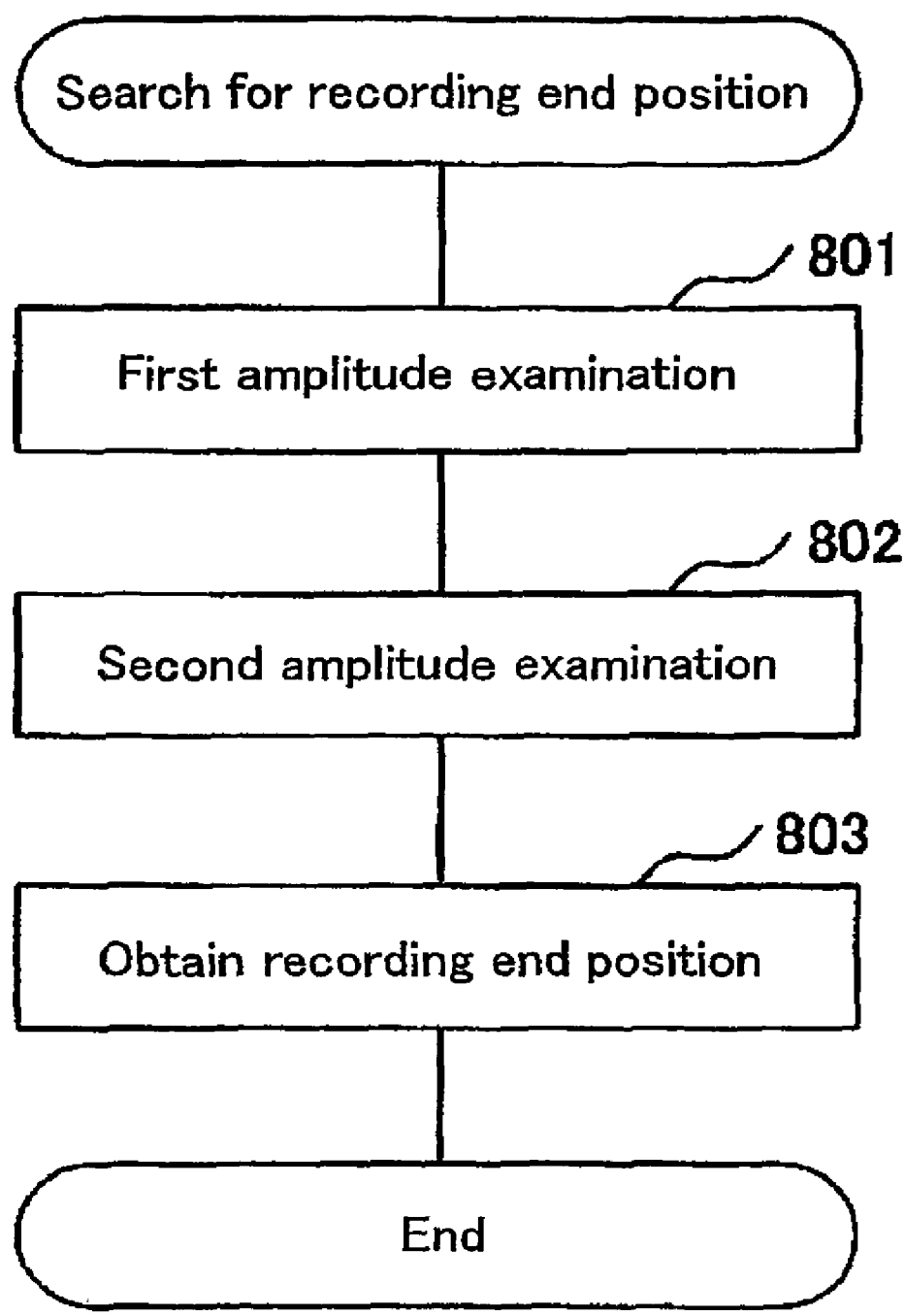
FIG. 7 is a flowchart showing a procedure for searching for a recording end position.

FIG. 6 shows a process for searching for a recording end position. FIG. 7 shows a procedure for searching for a recording end position. Searching for a recording end position means searching for the latest recorded defect management working area 21.

Hereinafter, a procedure for searching for a recording end position will be described step by step with reference to FIGS. 6 and 7.

Step 801: the defect management working information reading section 165 performs first amplitude examination. The first amplitude examination is performed at regular predetermined intervals of blocks from the beginning of the temporary defect management area 20 until no amplitude is found. After no amplitude is found, the process goes to step 802.

Step 802: the defect management working information reading section 165 performs second amplitude examination. In the second amplitude examination, a position at which the presence of amplitude ends is searched for between the position at which amplitude was found and the position at which no amplitude was found. After a position at which no amplitude is found, the process goes to step 803.

Step 803: the defect management working information reading section 165 obtains a recording end position obtained by the examination (the position of a border between the latest recorded defect management working area and an unrecorded defect management working area). After the recording end position is obtained, the process is ended.

With the above-described procedure, the defect management working information reading section 165 can read out the contents of the latest recorded defect management working area 21.

Note that a procedure for searching for a recording end position is not limited to the recording end position searching procedure described with reference to FIG. 7. For example, a recording end position can be found by searching a beginning position having amplitude from the end to the beginning of the temporary defect management area 20.

In the embodiment of FIG. 5, step 601 corresponds to "searching for the position of a border and obtaining border positional information indicating the position of the border". Step 602 corresponds to "reproducing latest disc definition structure based on the border positional information" and "obtaining positional information about latest disc management information based on the latest disc definition structure". Step 603 corresponds to "reproducing disc management information based on positional information about the latest disc management information".

However, a procedure for obtaining the latest defect list 15 and the latest DDS 14 from a recorded defect management working area neighboring a border between the recorded defect management working area and an unrecorded defect management working area in the write-once read-many optical disc 1 is not limited to the procedure of FIG. 5. Any procedure for obtaining the latest defect list 15 and the latest DDS 14 from a recorded defect management working area neighboring a border between the recorded defect management working area and an unrecorded defect management working area in the write-once read-many optical disc 1 can be employed as long as the procedure comprises the above-described "searching for the position of a border and obtaining border positional information indicating the position of the border", "reproducing latest disc definition structure based on the border positional information" and "obtaining positional information about latest disc management information based on the latest disc definition structure", and "reproducing disc management information based on positional information about the latest disc management information".

1.4. Update of Defect Management Information

Hereinafter, a method for recording information (a defect list 15 and a DDS 14) onto the write-once read-many optical disc 1 according to Embodiment 1 of the present invention will be described.

Figure 8:
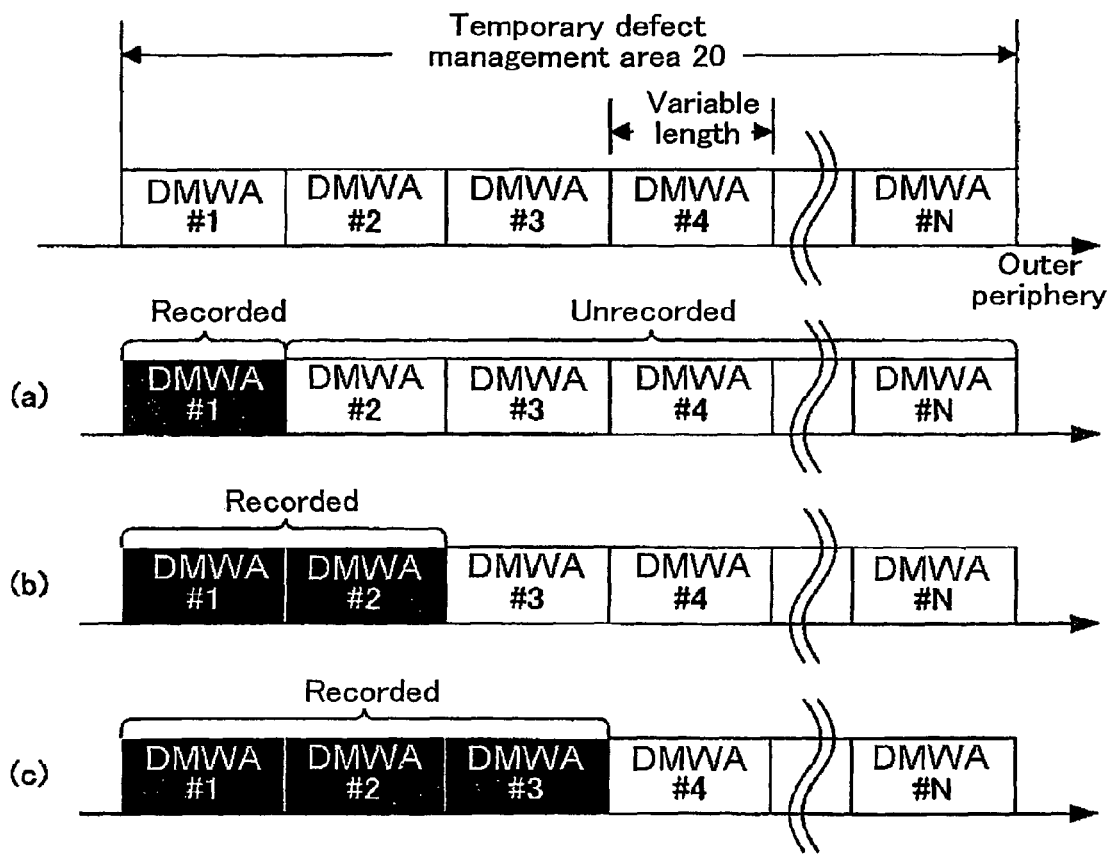
FIG. 8 is a diagram showing a state in which a defect list and a DDS are additionally recorded into a DMWA contained in a temporary defect management area.

FIG. 8 shows a state in which a defect list 15 and a DDS 14 are additionally recorded into the DMWA 21 contained in the temporary defect management area 20.

A portion (a) of FIG. 8 shows a state in which a defect list 15 and a DDS 14 are recorded into a DMWA#1 contained in the temporary defect management area 20 at a first time point. A portion (b) of FIG. 8 shows a state in which a defect list 15 and a DDS 14 are recorded into a DMWA#2 contained in the temporary defect management area 20 at a second time point. A portion (a) of FIG. 8 shows a state in which a defect list 15 and a DDS 14 are recorded into a DMWA#3 contained in the temporary defect management area 20 at a third time.

In FIG. 8, filled DMWAs indicate recorded DMWAs in which a defect list 15 and a DDS 14 have been recorded, while open DMWAs indicate unrecorded DMWAs in which the defect list 15 and the DDS 14 have not been recorded.

A new defect list 15 and DDS 14 are additionally recorded into an unrecorded DMWA which is located at the beginning of a plurality of unrecorded DMWAs. In other words, a new defect list 15 and DDS 14 are additionally recorded to an unrecorded DMWA neighboring a border between the unrecorded DMWA and a recorded DMWA.

Therefore, the latest defect list 15 and DDS 14 are located in a recorded DMWA neighboring the end of a plurality of recorded DMWAs. In other words, the latest defect list 15 and DDS 14 are located in a recorded DMWA neighboring a border between an unrecorded DMWA and the recorded DMWA.

Figure 9:
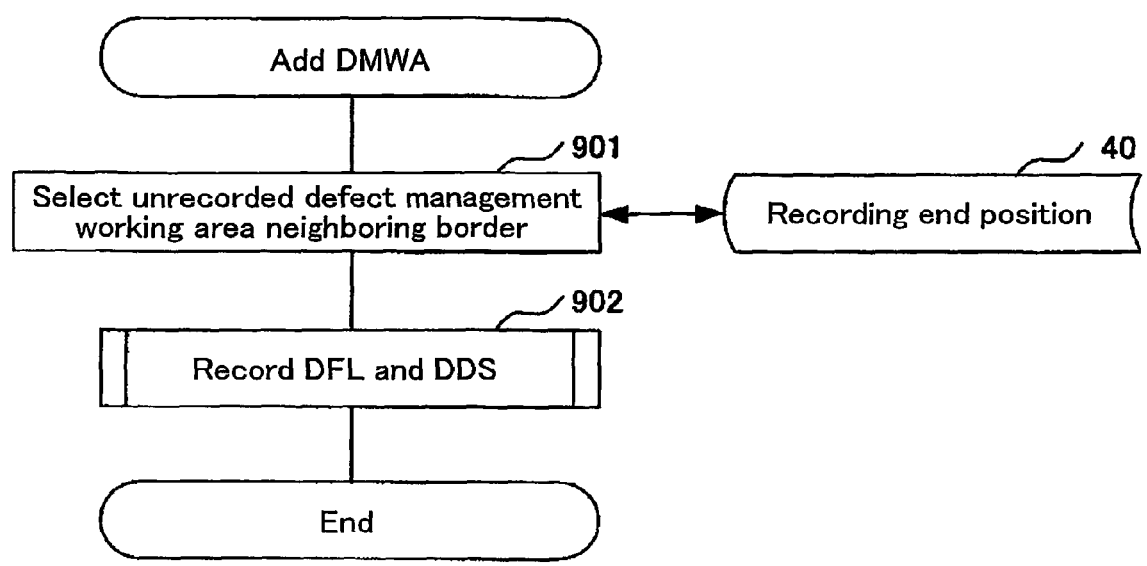
FIG. 9 is a flowchart of a procedure for additionally recording a defect list and a DDS into a defect management working area of a write-once read-many optical disc according to Embodiment 1 of the present invention.

FIG. 9 shows a procedure for additionally recording a defect list 15 and a DDS 14 into a defect management working area 21 of the write-once read-many optical disc 1 according to Embodiment 1 of the present invention.

The defect management working information writing section 166 additionally records a new defect list 15 and DDS 14 into a defect management working area 21.

In this case, the defect list 15 stored in the defect management information storage buffer 140 is permitted by the defect management information updating section 164 to retain the latest contents.

Specifically, for example, when a new defect block is detected, the defect management information updating section 164 adds a defect entry corresponding to a new replacement block (i.e., a new defect block) to a defect list 15 stored in the defect management information storage buffer 140, and sorts defect entries based on positional information about defect blocks, which are contained in the defect entries. Further, the defect management information updating section 164 adds one to the number of defect entries in the defect list header.

Hereinafter, a procedure for additionally recording a defect list 15 and a DDS 14 to a defect management working area 21 in the write-once read-many optical disc according to Embodiment 1 of the present invention will be described step by step with reference to FIG. 9.

Step 901: the defect management information updating section 164 selects an unrecorded defect management working area neighboring a border between a recorded defect management working area and the unrecorded defect management working area.

For example, the defect management information updating section 164 adds to one a recording end position 40 in the defect management information control memory 163 and updates a DDS 14 contained in the defect management information storage buffer 140 at the resultant recording end position 40, so that an unrecorded defect management working area is selected which is located at the beginning of a plurality of unrecorded defect management working areas. In other words, by updating a DDS 14 so that defect list beginning positional information 30 indicates the beginning position of an unrecorded defect management working area, an unrecorded defect management working area located at the beginning of a plurality of unrecorded defect management working areas is selected. After the DDS 14 is updated, the process goes to step 902.

Step 902: the defect management working information writing section 166 records a defect list 15, which is management information about the write-once read-many optical disc 1, into an unrecorded defect management working area neighboring a border and records a DDS 14 containing positional information about the recorded defect list 15 into the unrecorded defect management working area neighboring the border.

For example, the defect management working information writing section 166 records an updated defect list 15 contained in the defect management information storage buffer 140 to the beginning position of an unrecorded area and records an updated DDS 14 in such a manner as to follow the defect list 15. After the defect list 15 and the DDS 14 are recorded, the process is ended.

With the above-described procedure, the defect management working information writing section 166 records the latest defect list 15 and DDS 14 to a defect management working area 21 contained in the temporary defect management area 20.

Note that updating a defect list 15 using the defect management information updating section 164 is only illustrative. It may be only required that a defect list 15 contains information about defect(s). For example, sorting defect entries may not be required.

Note that a defect list 15 and a DDS 14 may be recorded into a defect management working area 21 of the temporary defect management area 20 at any timing as long as the defect list 15 and the DDS 14 are recorded in such a manner that allows the DDS 14 to be necessarily located at the end of a recorded defect management working area when the state of an apparatus and the state of a medium are changed. The state of an apparatus and the state of a medium are changed, means, for example, that a write-once read-many optical disc is ejected from the optical disc recording/reproduction apparatus 100 or that the optical disc recording/reproduction apparatus 100 is switched off.

Note that when a defect list 15 and a DDS 14 are recorded into a defect management working area, it may be determined whether or not the defect list 15 and the DDS 14 have been normally recorded.

Figure 10:
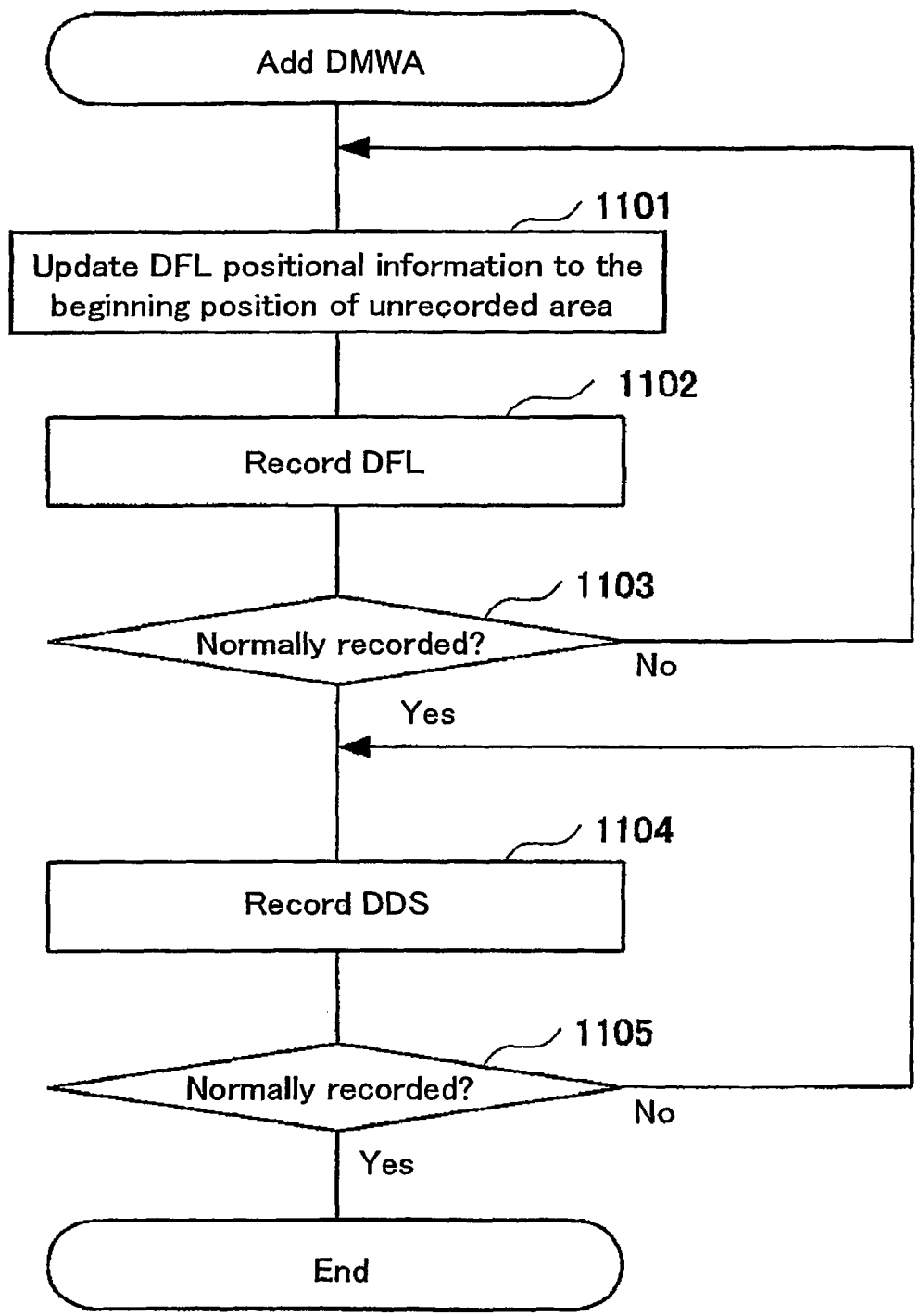
FIG. 10 is a flowchart of a procedure for additionally recording a new defect list and DDS into a defect management working area while determining whether or not the defect list and the DDS have been normally recorded.

FIG. 10 shows a procedure for additionally recording a new defect list 15 and DDS 14 into a defect management working area 21 while determining whether or not the defect list 15 and the DDS 14 have been normally recorded.

It is now assumed that the contents of a defect list 15 stored in the defect management information storage buffer 140 is permitted by the defect management information updating section 164 to retain the latest contents.

Hereinafter, a procedure for additionally recording a new defect list 15 and DDS 14 into a defect management working area 21 while determining whether or not the defect list 15 and the DDS 14 have been normally recorded will be described step by step with reference to FIG. 10.

Step 1101: the defect management information updating section 164 updates a DDS 14 contained in the defect management information storage buffer 140 at the recording end position 40 contained in the defect management information control memory 163, to which one has been added. In other words, the DDS 14 is updated in such a manner that the defect list beginning positional information 30 indicates the beginning position of an unrecorded defect management working area. After the DDS 14 is updated, the process goes to step 1102.

Step 1102: the defect management working information writing section 166 records an updated defect list 15 contained in the defect management information storage buffer 140 to the beginning position of an unrecorded defect management working area. After recording, the process goes to step 1103.

Step 1103: it is determined whether or not the defect list 15 has been normally recorded.

In this case, whether or not the defect list 15 has been normally recorded is performed by, for example, performing error correction for a block in which the defect list 15 is recorded or reading recorded data and determining whether or not the recorded data matches intended data.

When it is determined that the defect list 15 has not been normally recorded (i.e., recording of the defect list 15 has failed), the process goes to step 1101. In step 1101, the recording end position 40 is changed by adding the size of a defect list which has been previously recorded. In addition, the DDS 14 contained in the defect management information storage buffer 140 is updated so that a position obtained by adds to one the recording end position 40 is contained in the defect list beginning positional information 30.

When it is determined that the defect list 15 has been normally recorded (i.e., recording of the defect list 15 has been successful), the process goes to step 1104.

Step 1104: the updated DDS 14 is recorded. After the DDS 14 is recorded, the process goes to step 1105.

Step 1105: it is determined whether or not the DDS 14 has been normally recorded.

When it is determined that the DDS 14 has not been normally recorded (i.e., recording of the DDS 14 has failed), the process goes to step 1104.

When it is determined that the DDS 14 has been normally recorded (i.e., recording of the DDS 14 has been successful), the process is ended.

Step 1102 and step 1103 are repeated until the defect list 15 has been normally recorded. Step 1104 and step 1105 are repeated until the DDS 14 has been normally recorded.

With the above-described procedure, the defect management working area updating section 165 additionally records a new defect list 15 and DDS 14 into a defect management working area 21 while determining whether or not the defect list 15 and the DDS 14 have been normally recorded.

Note that step 1101 and step 1102 may be performed in reverse order. Specifically, after a defect list 15 is recorded and it is confirmed that the recording has been normally achieved, a DDS 14 containing defect list beginning positional information 30 is recorded into a defect management working area 21 in which the defect list 15 has been recorded.

Note that although a defect list 15 and a DDS 14 are located in different blocks among a plurality of blocks in the procedure described in FIG. 10, both a defect list 15 and a DDS 14 may share at least one block among a plurality of blocks.

If both a defect list 15 and a DDS 14 may share at least one block among a plurality of blocks, after a defect list 15 and a DDS 14 are recorded in a block shared by the defect list 15 and the DDS 14, it is determined whether or not the recording has been normally achieved. If the recording has failed, positional information is changed so that a position for a next recording corresponds to the defect list beginning positional information 30 of a DDS 14, and a defect list 15 and a DDS 14 are recorded again in a block shared by the defect list 15 and the DDS 14. Recording of a defect list 15 and a DDS 14 is repeatedly attempted until the defect list 15 and the DDS 14 are normally recorded.

Therefore, the data reliability of a defect list 15 and a DDS 14 recorded in a defect management working area 21 can be improved.

FIG. 11 shows a state in which a defect list 15 and a DDS 14 are additionally recorded into a defect management working area 21 in accordance with the procedure described with reference to FIG. 10.

A portion (a) of FIG. 11 shows a state in which a defect block is present in a defect management working area #1 (DMWA#1), and therefore, first recording of a defect list 15 to the DMWA#1 has failed. Subsequently, recording of the defect list 15 is attempted. If recording of the defect list 15 is successful, a DDS 14 is recorded following the defect list 15.

A portion (b) of FIG. 11 shows a state in which no defect block is present in a DMWA#2.

As described above, even if a defect block is present in a defect management working area 21 and therefore recording of a defect list 15 and a DDS 14 fails, recording of the defect list 15 and the DDS 14 is repeatedly attempted until the defect list 15 and the DDS 14 are normally recorded. Thereby, recording of a defect list 15 and a DDS 14 are appropriately performed.

In the embodiment of FIG. 9, step 901 corresponds to "selecting an unrecorded disc management working area neighboring a border between a recorded disc management working area and the unrecorded disc management working area"; step 902 corresponds to "recording disc management information, which is management information about a write-once read-many information recording medium, into to the unrecorded disc management working area neighboring the border" and "recording a disc definition structure containing positional information about disc management information defined in the above-described recording step into the unrecorded disc management working area neighboring the border".

However, a procedure for additionally recording a defect list and a DDS into a defect management working area 21 of the write-once read-many optical disc 1 according to Embodiment 1 of the present invention is not limited to that of FIG. 9. Any procedure for additionally recording a defect list and a DDS into a defect management working area 21 of the write-once read-many optical disc 1 according to Embodiment 1 of the present invention may be employed as long as the procedure has functions of "selecting an unrecorded disc management working area neighboring a border between a recorded disc management working area and the unrecorded disc management working area"; "recording disc management information, which is management information about a write-once read-many information recording medium, into to the unrecorded disc management working area neighboring the border" and "recording a disc definition structure containing positional information about disc management information defined in the above-described recording step into the unrecorded disc management working area neighboring the border".

Figure 12:
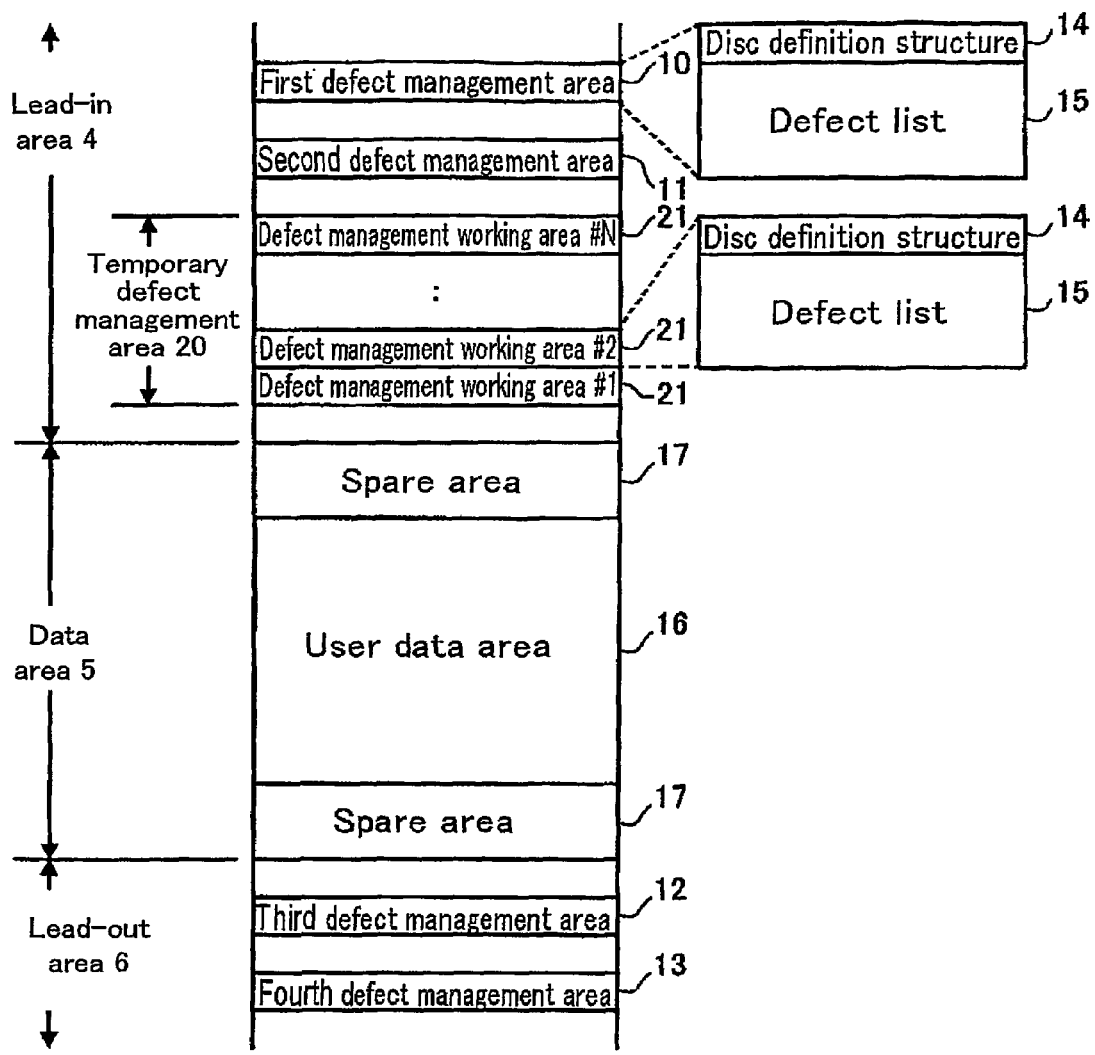
FIG. 12 is a diagram showing a data structure of another write-once read-many optical disc according to Embodiment 1 of the present invention.

FIG. 12 shows a data structure of another write-once read-many optical disc 1 according to Embodiment 1 of the present invention.

In the other write-once read-many optical disc 1 according to Embodiment 1 of the present invention, at least one defect management working area 21 (DMWA#1 to DMWA#N (N: an integer of 1 or more)) is allocated in a direction from the end to the beginning of a temporary defect management area 20 (in a direction from the outer periphery to the inner periphery of the write-once read-many optical disc 1). A DDS 14 and a defect list 15 are recorded sequentially from a defect management working area 21 at the end of the temporary defect management area 20 (closer to the outer periphery of the write-once read-many optical disc 1).

A DDS 14 and a defect list 15 are provided in a defect management working area 21 in the same order as that of a DDS 14 and a defect list 15 provided in each of a DMA1 to a DMA4. In a defect management working area 21, a defect list 15 and a DDS 14 are located in this order along a direction from the end to the beginning of the temporary defect management area 20 (i.e., in a direction from the outer periphery to the inner periphery of the write-once read-many optical disc 1).

A DDS 14 is located in, for example, a recorded defect management working area neighboring a border between the recorded defect management working area and an unrecorded defect management working area. The DDS 14 is located at a predetermined position which is calculated based on the beginning of the recorded defect management working area neighboring the border.

In the write-once read-many optical disc 1 of FIG. 12, when searching for the latest recorded defect management working area 21, the defect management working information reading section 165 of the optical disc recording/reproduction apparatus 100 searches for the beginning position of recorded areas (hereinafter also referred to as "recording beginning position") in the temporary defect management area 20 and determines that a defect management working area 21 located at the recording beginning position is the latest recorded defect management working area 21. In other words, in FIG. 6, a recording beginning position is searched for where a recorded area is replaced with an unrecorded area. In the defect management working information writing section 166, an unrecorded defect management working area, which is closer to the inner periphery than a recorded beginning area in the temporary defect management area 20, is regarded as an available defect management working area 21.

In the write-once read-many information recording medium of the present invention, at least one defect management working area is sequentially allocated in a predetermined direction. The latest defect list and the latest DDS are provided in a recorded defect management working area neighboring a border between the recorded defect management working area and an unrecorded defect management working area, wherein the latest defect list and the latest DDS are arranged in this order along the predetermined direction. Therefore, it is easy to find the latest DDS and the latest defect list.

Hereinafter, an effect of the above-described write-once read-many information recording medium of the present invention, in which the predetermined direction is a direction from the inner periphery to the outer periphery of the write-once read-many optical disc 1, will be described in detail.

It is now assumed that the latest DFL 15 and the latest DDS 14 are arranged in a defect management working area 21 in this order along the direction from the outer periphery to the inner periphery of the write-once read-many optical disc 1 as with the latest DFL 15 and the latest DDS 14 in the DMA1 to the DMA4.

It is possible to search for a recording end position in the temporary defect management area 20 (FIG. 8). However, the size of a DFL 15 varies depending on the number of defect entries. Therefore, it is not possible to calculate the beginning position of a DFL 15 from the end position.

In order to obtain the latest DFL 15 in the above-described data structure, the beginning position of a DFL 15 is calculated from a DDS 14 located at the beginning of the temporary defect management area 20, and the size of the DFL 15 is calculated from the number of defect entries contained in the DFL 15 to determine the position of the next DDS 14. The beginning position of a DFL 15 is calculated from this DDS 14, . . . . In this manner, the temporary defect management area 20 is tracked sequentially. In the data structure in which a DDS 14 precedes a DFL 15, a long time is disadvantageously required. Moreover, if a block from which data cannot be reproduced is present in a DDS 14 and a DFL 15, a search for the latest DFL 15 is hindered, so that the reliability is disadvantageously lowered.

If a DFL 15 has a fixed length, the problem with the search for the latest DDS 14 and the latest DFL 15 can be avoided. In this case, however, the number of times of additionally recording data into a temporary defect management area 20 is reduced or a larger size of temporary defect management area 20 is required, leading to a reduction in the efficiency of use of areas.

In the write-once read-many optical disc 1 of Embodiment 1, at least one defect management working area 21 is allocated in a predetermined direction; the latest DFL 14 and the latest DDS 15 are arranged in this order along the predetermined direction and located in a recorded defect management working area neighboring a border between the recorded defect management working area and an unrecorded defect management working area; if a DDS 14 is located at a predetermined position which can be calculated based on the border, a DFL 15 having a variable size can be utilized, resulting in a high efficiency of use of a defect management working area 21; and the recording position of the latest DFL 15 is recorded in a DDS 14 in a defect management working area 21 at the recording end position in the temporary defect management area 20 (i.e., a recorded defect management working area neighboring the border). Therefore, the above-described problems can be solved.

In the write-once read-many optical disc of the present invention, at least one defect management working area is allocated in a predetermined direction; the latest DFL and the latest DDS are arranged in this order along the predetermined direction and located in a recorded defect management working area neighboring a border between the recorded defect management working area and an unrecorded defect management working area; and a DDS is located at a predetermined position which can be calculated based on the border. Therefore, it is possible to easily find the latest DDS and the latest defect list.

1.5. Finalization

Figure 13:
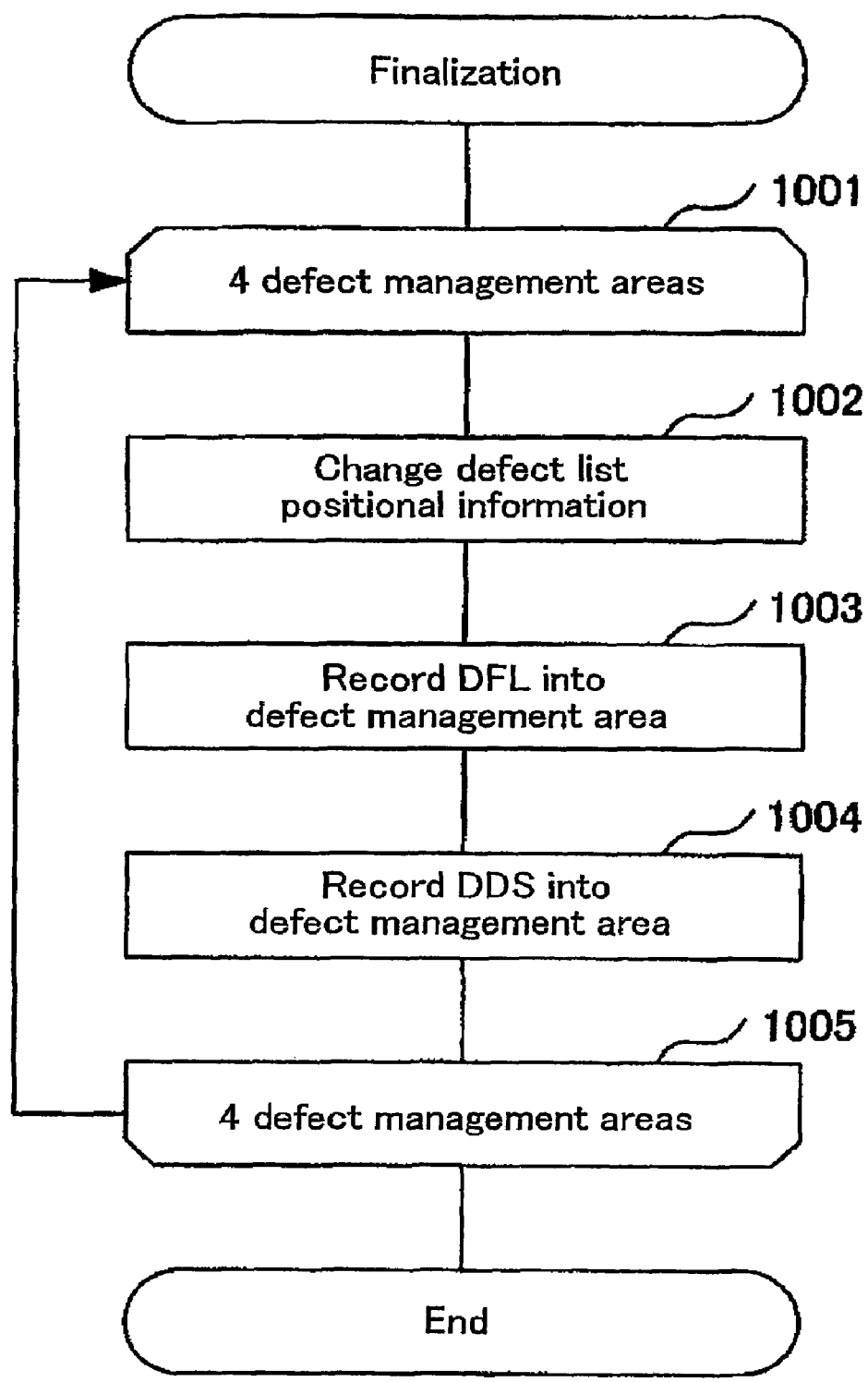
FIG. 13 is a flowchart of a procedure for finalization according to Embodiment 1 of the present invention.

FIG. 13 shows a procedure for finalization according to Embodiment 1 of the present invention. By recording a defeat list 15 and a DDS 14 into each of the DMA1 to the DMA4 of the write-once read-many optical disc 1 of the present invention, the finalization of Embodiment 1 of the present invention is performed.

Here, the contents of a defect list 15 stored in the defect management information storage buffer 140 are permitted by the defect management information updating section 164 to retain the latest contents.

Hereinafter, the finalization procedure according to Embodiment 1 of the present invention will be described step by step with reference to FIG. 13.

Step 1001: recording of a defect list 15 and a DDS 14 into one (e.g., DMA1) of the DMA1 to the DMA4 is started.

Step 1002: the defect management information updating section 164 changes the latest DDS 14 to the last DDS 14 by changing positional information indicating the position of a recorded defect management working area neighboring a border to positional information indicating the position of one of at least one defect management area. For example, the defect management information updating section 164 changes the latest DDS 14 to the last DDS 14 by changing the defect list beginning positional information 30 of a DDS 14 in the defect management information storage buffer 140 to the defect list beginning positional information of the defect management area (DMA1) to be recorded. After the defect list beginning positional information 30 is changed, the process goes to step 1003.

Step 1003: the defect management information writing section 162 records the last defect list 15 into one of at least one defect management areas. For example, the defect management information writing section 162 records to the DMA1 a defect list 15 in the defect management information storage buffer 140. After the defect list 15 is recorded, the process goes to step 1004.

Step 1004: the defect management information writing section 162 records the last DDS 14 into one of at least one defect management areas based on the last defect list 15. For example, the defect management information writing section 162 records to the DMA1 a DDS 14 in the defect management information storage buffer 140. After the DDS 14 is recorded, the process goes to step 1005.

Step 1005: recording of a defect list 15 and a DDS 14 into one (DMA1) of the DMA1 to the DMA4 is completed. After recording is completed, the process goes to step 1001.

Step 1002 to step 1004 are performed for all of the remaining defect management areas (i.e., the DMA2 to the DMA4).

After recording of a defect list 15 and a DDS 14 into the DMA1 to the DMA4 is completed, finalization is completed.

Note that in step 1001 to step 1005, the last defect list 15 is the latest defect list 15 located in at least one defect management area, and the last disc definition structure 14 is a disc definition structure 14 containing positional information about the last defect list 15. The latest defect list 15 is generally a defect list 15 which is recorded in a recorded defect management working area neighboring a border between the recorded defect management working area and an unrecorded defect management working area. The latest disc definition structure 14 is generally a disc definition structure 14 which contains positional information about the last defect list 15.

With the above-described procedure, the defect management information processing section 160 can record the last DDS 14 and the last defect list 15 into the DMA1 to the DMA4 for finalization.

Figure 14:
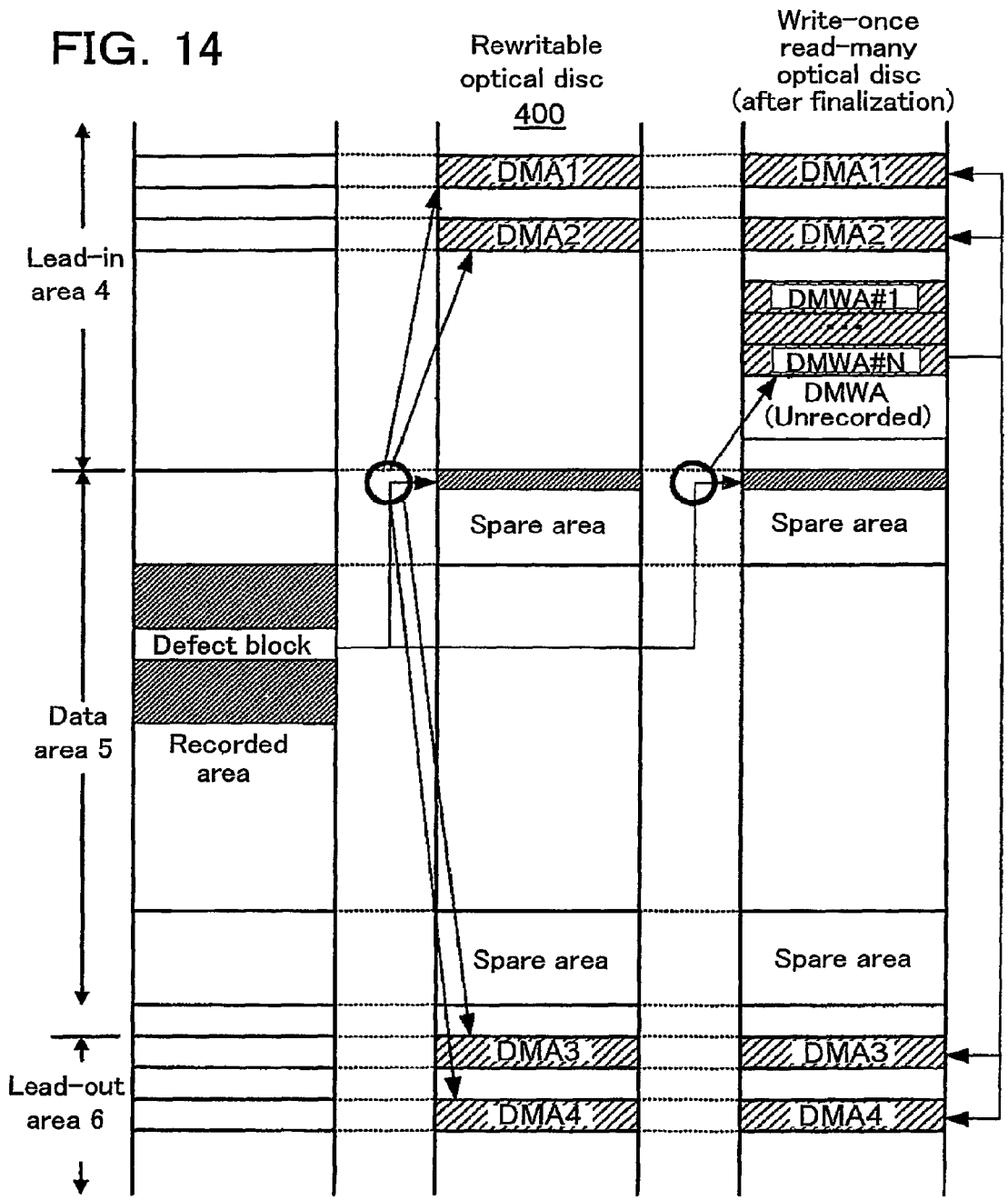
FIG. 14 is a diagram showing data structures of a rewritable optical disc and a write-once read-many optical disc after finalization for comparison.

FIG. 14 shows data structures of a rewritable optical disc 400 and a write-once read-many optical disc after finalization for comparison.

Figure 24:
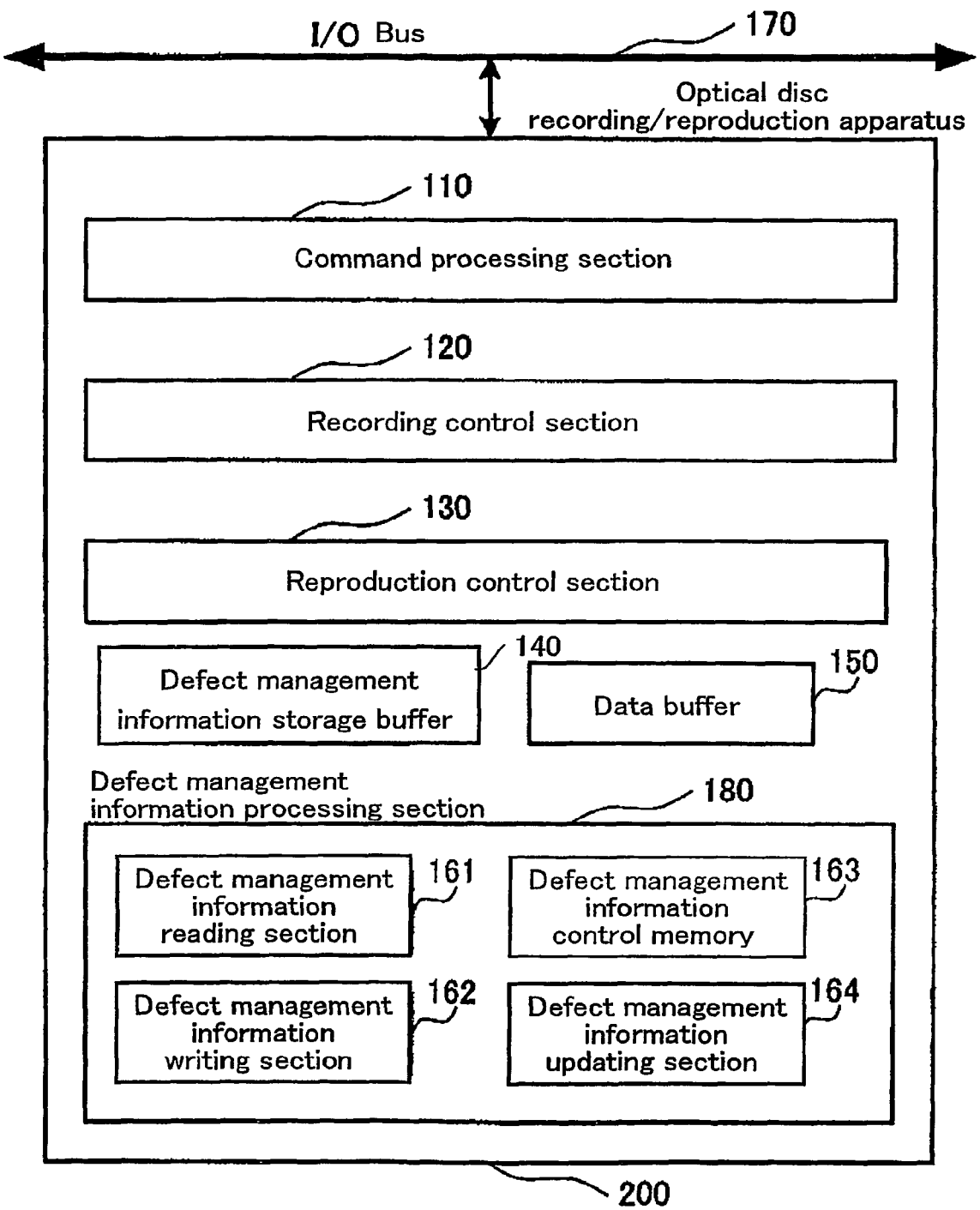
FIG. 24 is a diagram showing the structure of an optical disc recording/reproduction apparatus which can handle the conventional rewritable optical disc of FIG. 23.

By performing the finalization procedure of FIG. 13, the data structure of the DMA1 to the DMA4 provided in a write-once read-many optical disc after finalization is the same as the data structure of the DMA1 to the DMA4 provided in the rewritable optical disc 400. Thus, data can be reproduced from the finalized write-once read-many optical disc by the rewritable optical disc recording/reproduction apparatus 200 of FIG. 24, resulting in a compatible optical disc for reproduction.

Note that generally, in finalization, information having the same contents as those of a defect list 15 recorded in a recorded defect management working area neighboring a border between the recorded defect management working area and an unrecorded defect management working area is recorded in a defect management working area. Therefore, in an apparatus capable of handling the data structure of the write-once read-many optical disc of the present invention, if the contents of the latest defect management working area 21 can be obtained, it is not necessary to obtain the contents of the DMA1 to the DMA4, so that a time required for obtaining defect management information can be reduced. Even when recording of a DDS 14 and a defect list 15 into the DMA1 to the DMA4 is totally failed, data can be reproduced from the write-once read-many optical disc 1 by obtaining a DDS 14 and a defect list 15 from the latest defect management working area 21.

Thus, according to the finalization of the present invention, the data structure of a finalized write-once read-many optical disc is the same as the data structure of a rewritable optical disc. As a result, a rewritable optical disc recording/reproduction apparatus can reproduce data from a finalized write-once read-many optical disc, thereby obtaining compatibility.

In the example of FIG. 13, the defect management information writing section 162 functions as "a section for recording the last disc management information into at least one disc management area" and "a section for recording the last disc definition structure into at least one disc management area based on the last disc management information". However, the defect management information writing section 162 only shows an exemplary portion of the function of the present invention. A section having any constitution may be employed as long as the above-described function can be achieved.

Note that the write-once read-many optical disc 1 can be finalized by recording a finalization identifying flag onto the write-once read-many optical disc 1.

For example, the defect management working information writing section 166 records the finalization identifying flag into at least one of a disc definition structure 14 and a defect list 15.

Figure 15:
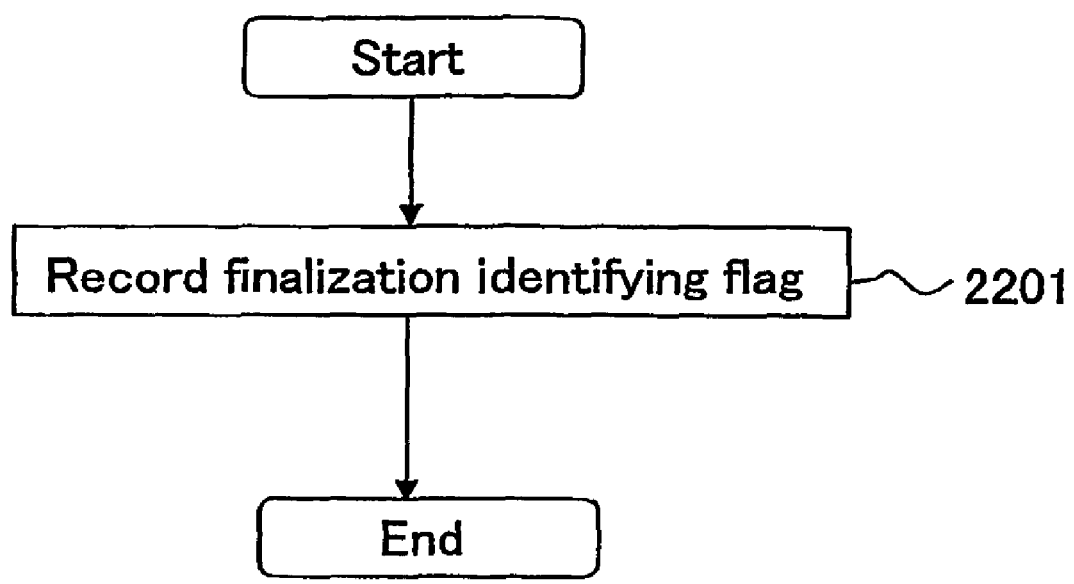
FIG. 15 is a flowchart of another finalization procedure according to Embodiment 1 of the present invention.

FIG. 15 shows another finalization procedure according to Embodiment 1 of the present invention. The other finalization is performed by recording a finalization identifying flag into the write-once read-many optical disc 1 of the present invention.

Hereinafter, the other finalization procedure according to Embodiment 1 of the present invention will be described step by step with reference to FIG. 15.

Step 2201: a finalization identifying flag is recorded onto the write-once read-many optical disc 1. The finalization identifying flag is recorded at a predetermined position on the write-once read-many optical disc 1. The predetermined position is any position from which the optical disc recording/reproduction apparatus of the present invention can read the finalization identifying flag.

If the predetermined position is a defect management working area 21, the defect management working information writing section 166 records the finalization identifying flag into at least one of a disc definition structure 14 and a defect list 15 in a defect management working area 21. In this case, the defect management working information reading section 165 reads the finalization identifying flag.

After the finalization identifying flag is recorded into at least one of a disc definition structure 14 and a defect list 15, the process is ended.

1.6. Finalization Determination

Figure 16:
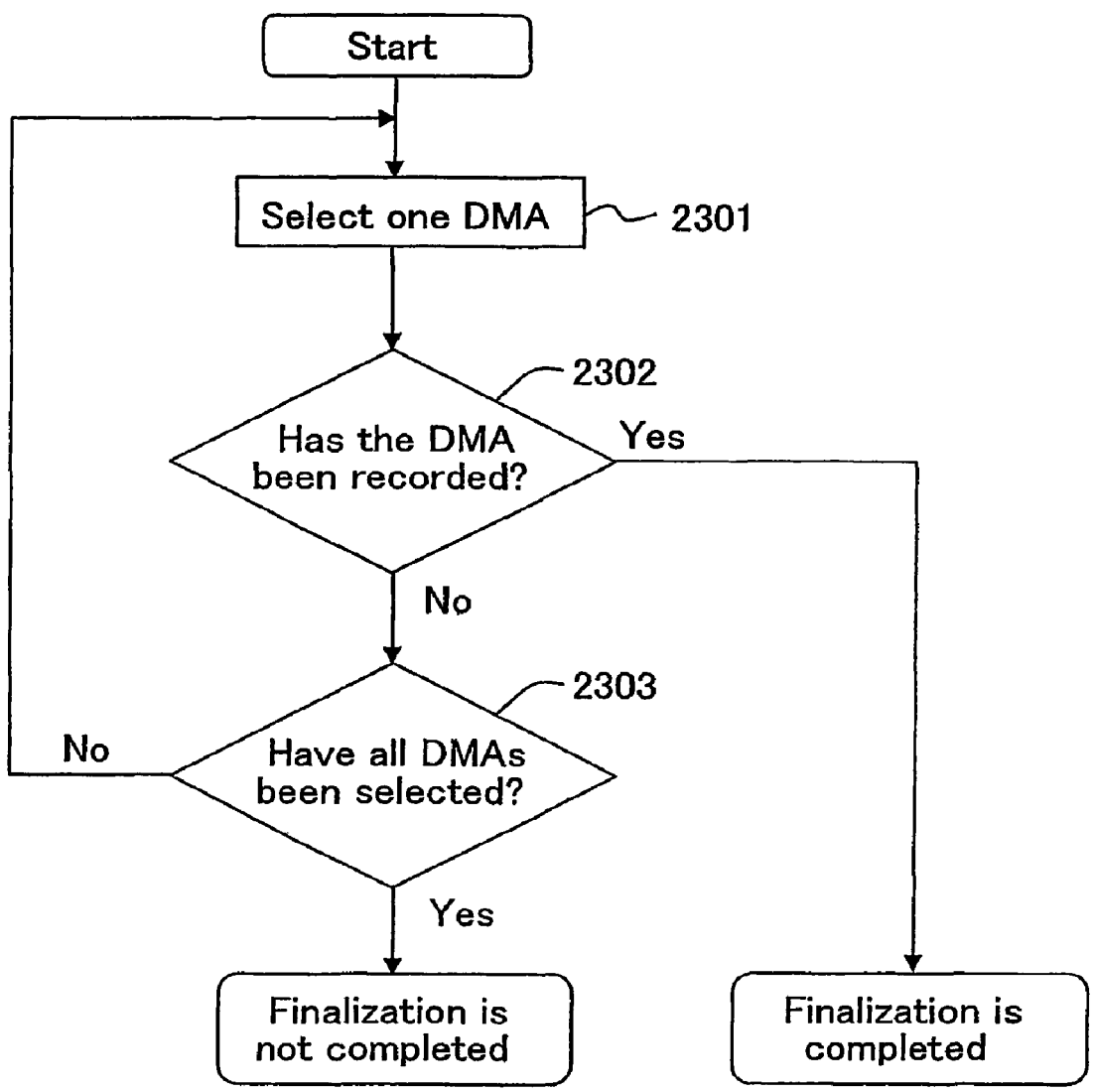
FIG. 16 is a flowchart of a finalization determination procedure for determining whether or not a write-once read-many optical disc is already finalized.

FIG. 16 shows a finalization determination procedure for determining whether or not the write-once read-many optical disc 1 is already finalized. Hereinafter, the finalization determination procedure (step 2301 to step 2303) for determining whether or not the write-once read-many optical disc 1 is already finalized will be described step by step with reference to FIG. 16.

Note that in step 2301 to step 2303, the last defect list 15 is the latest defect list 15 provided in at least one defect management area; the last disc definition structure 14 is a disc definition structure 14 containing positional information about the last defect list 15; and the latest defect list 15 is a defect list 15 which is recorded in a recorded defect management working area neighboring a border between the recorded defect management working area and an unrecorded defect management working area.

Step 2301: the defect management information reading section 161 selects one of at least one defect management areas allocated in the write-once read-many optical disc 1. After one of at least one defect management areas is selected, the process goes to step 2302.

Step 2302: the defect management information reading section 161 reads out data from one of the at least one defect management areas allocated in the write-once read-many optical disc 1 and determines whether or not the defect management area has been recorded. For example, the defect management information reading section 161 reads out data from one of the DMA1 to the DMA4, and based on the result of reading, determines whether or not the last defect list and the last DDS are recorded in one of the DMA1 to the DMA4.

If the amplitude value of a read signal indicating the result of reading data is greater than or equal to a predetermined threshold value, it is determined that the defect management area has been recorded. If the amplitude value of a read signal indicating the result of reading data does not exceed the predetermined threshold value, it is determined that the defect management area is unrecorded. For example, data is read from the DMA1, and based on the result of reading, it is determined whether or not the DMA1 has been recorded.

Data to be read out is not limited to the last defect list 15 and the last DDS 14. The contents of the data are not particularly limited as long as the data is used to determine whether or not a defect management area has been recorded in accordance with the procedure described with reference to FIGS. 6 and 7.

The procedure for determining whether or not a defect management area has been recorded is similar to the procedure described in FIGS. 6 and 7 and the description is omitted. Note that in the procedure described in FIGS. 6 and 7 the defect management working information reading section 165 examines amplitude, while in the finalization determination procedure the defect management information reading section 161 examines amplitude.

Note that the procedure for determining whether or not a defect management area has been recorded is not limited to the procedure described in FIGS. 6 and 7. By examining whether or not data is correctly read out, it may be determined whether or not a defect management area has been recorded. For example, based on the result of examining whether or not the last defect list 15 or the last DDS 14 is correctly read from a defect management area, it is determined whether or not a defect management area has been recorded.

If a defect management area has been recorded, it is determined that the write-once read-many optical disc 1 is changed from a write-once read-many state to a non-write-once read-many state, and the process is ended.

If a defect management area is not recorded, it is determined that the write-once read-many optical disc 1 has not been changed from the write-once read-many state to the non-write-once read-many state, and the process goes to step 2303.

Step 2303: the defect management information reading section 161 determines whether or not all of the at least one defect management areas allocated in the write-once read-many optical disc 1 are already selected.

If all of the defect management areas are already selected, it is determined that the write-once read-many optical disc 1 has not been changed from the write-once read-many state to the non-write-once read-many state, and the process is ended.

If not all of the defect management areas are already selected, the process goes to step 2301.

If it is determined that at least one of the DMA1 to the DMA4 has been recorded, it is determined that the write-once read-many optical disc 1 has been changed from the write-once read-many state to the non-write-once read-many state. If it is determined that all of the DMA1 to the DMA4 are unrecorded, it is determined that the write-once read-many optical disc 1 has not been changed from the write-once read-many state to the non-write-once read-many state.

For example, the defect management information reading section 161 reads out data from at least one of the DMA1 to the DMA4. If data is normally reproduced, it is determined that the write-once read-many optical disc 1 has been finalized. If all of the DMA1 to the DMA4 are unrecorded and therefore data cannot be normally reproduced from these defect management areas, it is determined that the write-once read-many optical disc 1 has not been finalized.

In the embodiment of FIG. 16, step 2302 corresponds to "reading out data from one of at least one disc management areas and determining whether or not the defect management area has been recorded" and step 2303 corresponds to "determining, based on the result of the above-described determination, whether or not a write-once read-many information recording medium has been changed from a write-once read-many state to a non-write-once read-many state".

However, a finalization determination procedure for determining whether or not the write-once read-many optical disc 1 is already finalized is not limited to that of FIG. 16. Any finalization determination procedure for determining whether or not the write-once read-many optical disc 1 is already finalized can be employed as long as it has functions of "reading out data from one of at least one disc management areas and determining whether or not the defect management area has been recorded" and "determining, based on the result of the above-described determination, whether or not a write-once read-many information recording medium has been changed from a write-once read-many state to a non-write-once read-many state".

Figure 17:
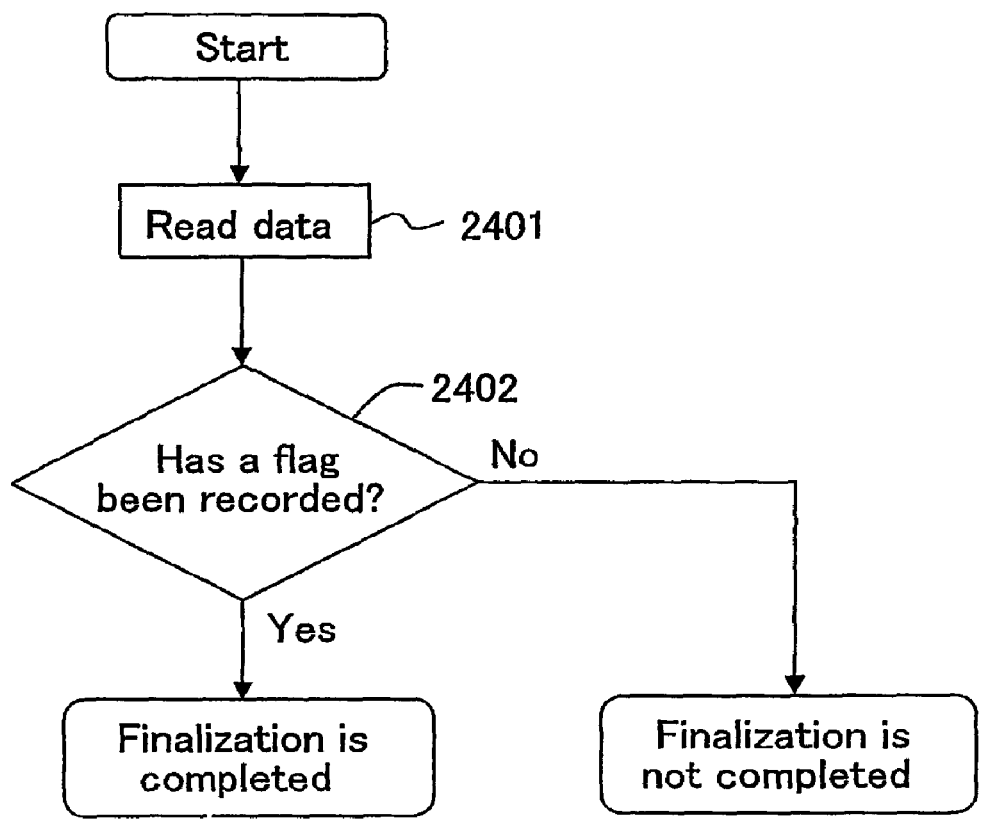
FIG. 17 is a flowchart of another finalization determination procedure for determining whether or not a write-once read-many optical disc is already finalized.

FIG. 17 shows another finalization determination procedure for determining whether or not the write-once read-many optical disc 1 is already finalized. Hereinafter, the other finalization determination procedure for determining whether or not the write-once read-many optical disc 1 is already finalized will be described step by step with reference to FIG. 17.

Step 2401: the optical disc recording/reproduction apparatus 100 reads out data from the write-once read-many optical disc 1. For example, the defect management working information reading section 165 reads out data from a recorded defect management working area 21 neighboring a border between the recorded defect management working area and an unrecorded defect management working area. A procedure for reading out data is similar to that which is described in FIG. 5 and the description is omitted.

After data is readout, the process goes to step 2402.

Step 2402: it is determined whether or not a finalization identifying flag has been recorded on the write-once read-many optical disc 1. For example, based on the read data, the defect management working information reading section 165 determines whether or not the finalization identifying flag has been recorded at a predetermined position in a defect management working area 21. Note that the recording position of the finalization identifying flag is not limited to a predetermined position of a defect management working area 21. The recording position of the finalization identifying flag may be any position that can be read out by the optical disc recording/reproduction apparatus 100. The predetermined position may be, for example, at least one of a disc definition structure 14 and a defect list 15.

Based on the result of determination, it is determined whether or not the write-once read-many optical disc 1 has been changed from a write-once read-many state to a non-write-once read-many state.

If a finalization identifying flag has been recorded, it is determined that the write-once read-many optical disc 1 has been changed from the write-once read-many state to the non-write-once read-many state and the process is ended.

If a finalization identifying flag has not been recorded, it is determined that the write-once read-many optical disc 1 has not been changed from the write-once read-many state to the non-write-once read-many state and the process is ended.

For example, when a finalization identifying flag is read from at least one of a disc definition structure 14 and a defect list 15, the defect management working information reading section 165 determines that the write-once read-many optical disc 1 has been finalized.

In the embodiment of FIG. 17, step 2402 corresponds to "determining whether or not a finalization identifying flag indicating prohibition of additional recording of data into at least one disc management working area is recorded in a write-once read-many information recording medium" and "determining, based on the result of the above-described determination, whether or not the write-once read-many information recording medium has been changed from a write-once read-many state to anon-write-once read-many state".

However, the other finalization determination procedure for determining whether or not the write-once read-many optical disc 1 has been finalized is not limited to that of FIG. 17. Any finalization determination procedure for determining whether or not the write-once read-many optical disc 1 has been finalized can be employed as long as it has functions of "determining whether or not a finalization identifying flag indicating prohibition of additional recording of data into at least one disc management working area is recorded in a write-once read-many information recording medium" and "determining, based on the result of the above-described determination, whether or not the write-once read-many information recording medium has been changed from a write-once read-many state to a non-write-once read-many state".

Note that Embodiment 1 of the present invention is described assuming that each of a defect list (DFL) 15 and a disc definition structure (DDS) 14 has a block unit which is a unit for error correction. If the size of a DDS 14 or the size of a DFL 15 is less than the block size, the blank portion of a block is recorded with meaningless data (e.g., 0) to fill the block.

A DFL 15 and a DDS 14 are provided in different blocks in the foregoing description. However, if a DDS 14 is located at a predetermined position in a predetermined block, which can be calculated based on a border, among blocks contained in a recorded defect management working area neighboring the border, a DFL 15 and a DDS 14 may share at least one blocks. For example, a DDS 14 may be located at a predetermined position in the last block of a DFL 15. As long as the position of a DDS 14 is uniquely determined based on a recording end, it is possible to easily find the latest DDS 14 and DFL 15.

In Embodiment 1 of the present invention, a block which is a unit for error correction is described as a unit for recording/reproduction and defect management. However, for example, a sector which is an accessible minimum unit (1 sector has a size of 2 KBytes) may be employed as a unit for recording/reproduction and defect management in the present invention. Such modification can be made without departing from the spirit and scope of the present invention. Modifications and variations obvious to those skilled in the art are within the scope of the claims of the present invention.

In Embodiment 1 of the present invention, a defect management working area 21 contains a defect list 15 (i.e., child information) and a DDS 14 (i.e., parent information) containing positional information about the defect list 15. However, the number of pieces of child information is not limited to one as long as the parent information contains positional information about the child information. A plurality of pieces of child information may be present in a defect management working area 21. In other words, parent information may contain positional information about a plurality of pieces of child information. In this case, the same effect can be obtained.

EMBODIMENT 2

2.1. Optical Disc Data Structure

A write-once read-many optical disc 300 according to Embodiment 2 of the present invention has the same data structure as that of Embodiment 1 of the present invention, except for the defect management working area 21 (DMWA). The description is omitted except for that of the defect management working area 21 (DMWA).

Figure 18:
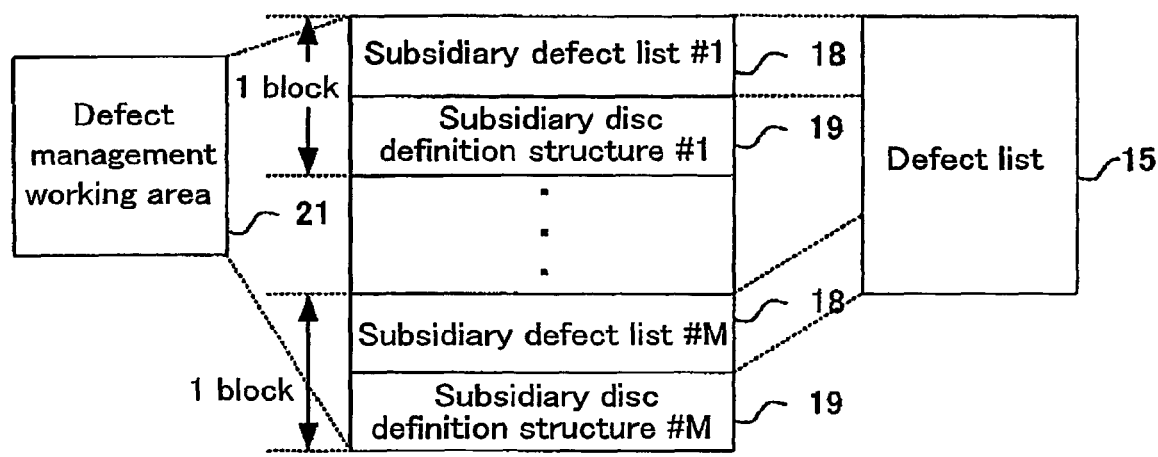
FIG. 18 is a diagram showing a data structure of a DMWA according to Embodiment 2 of the present invention.

FIG. 18 shows a data structure of a DMWA according to Embodiment 2 of the present invention.

A DMWA contains M blocks (M is an integer of 1 or more). In each of the M blocks, a subsidiary defect list (hereinafter also referred to as "SDFL") 18 and a subsidiary disc definition structure (hereinafter also referred to as "SDDS") 19 are provided.

A SDDS 19 is information having a fixed size (e.g., 1 sector (2 KBytes)). A SDDS 19 is located at a predetermined position (e.g., the end sector of a block) in each block contained in a DMWA.

The size of a SDDS 19 is the same as that of a disc definition structure (DDS) 14.

Note that the size of a SDDS 19 is not limited to the size of a DDS 14.

Note that a SDDS 19 may not have a fixed length as long as a SDDS 19 is located at a predetermined position of each block.

If the size of a defect list (DFL) 15 is added to the size of a SDDS 19 and the sum exceeds the size of 1 block, the DFL 15 is divided into SDFLs 18 so that the size of a SDDS 19 plus the size of SDFL(s) 18 is within the size of 1 block. A combination of all SDFLs 18 is a DFL 15.

A SDFL 18 is a division of a DFL 15. Therefore, defect list header 32 is located at a predetermined position in any of SDFLs 18 (e.g., the beginning of a SDFL #1).

The size of a DFL 15 is a variable length, so that the number of SDFLs 18 and the size of a SDFL 18 are variable. The addition of the size of a SDFL 18 and the size of a SDDS 19 is necessarily within the size of 1 block.

Here, if the addition of the size of a SDFL 18 and the size of a SDDS 19 is less than the size of 1 block, the blank portion of a block is recorded with meaningless data (e.g., 0) to fill the block.

Figure 19:
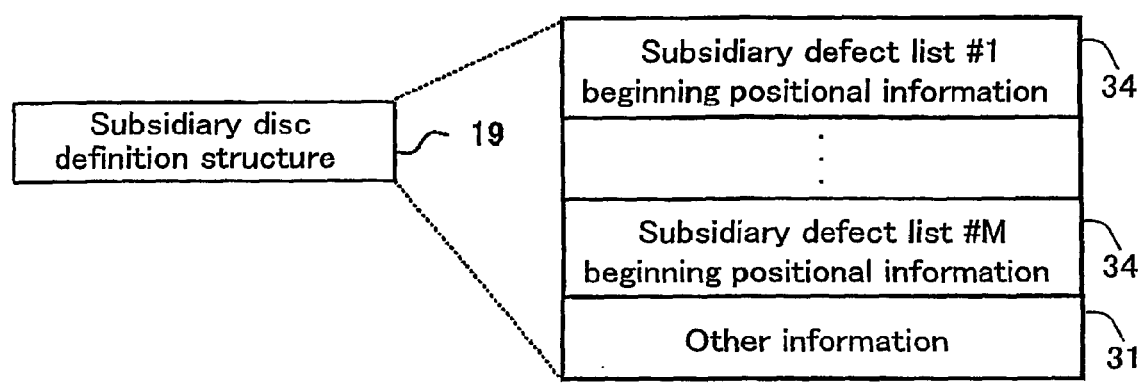
FIG. 19 is a diagram showing a structure of a SDDS.

FIG. 19 shows a structure of a SDDS 19.

A SDDS 19 contains subsidiary defect list beginning positional information 34 which is positional information about all SDFLs 18 present in a DMWA.

Note that a SDDS 19 may contain subsidiary defect list beginning positional information 34 for not all SDFLs 18. For example, a SDDS 19 may contain subsidiary defect list beginning positional information 34 only about a beginning SDFL 18, an end SDFL 18, and SDFL(s) 18 constituting the same block.

2.2. Configuration of an Optical Disc Recording/Reproduction Apparatus

An optical disc recording/reproduction apparatus according to Embodiment 2 of the present invention has the same configuration as that of the optical disc recording/reproduction apparatus 100 according to Embodiment 1 of the present invention and the description is omitted.

2.3. Obtaining Latest Defect Management Information

A method for obtaining (reproducing) information (a SDDS and a SDFL recorded in a recorded defect management working area neighboring a border between the recorded defect management working area and the unrecorded defect management working area) recorded in a write-once read-many optical disc 300 according to Embodiment 2 of the present invention, will be described below.

Figure 20:
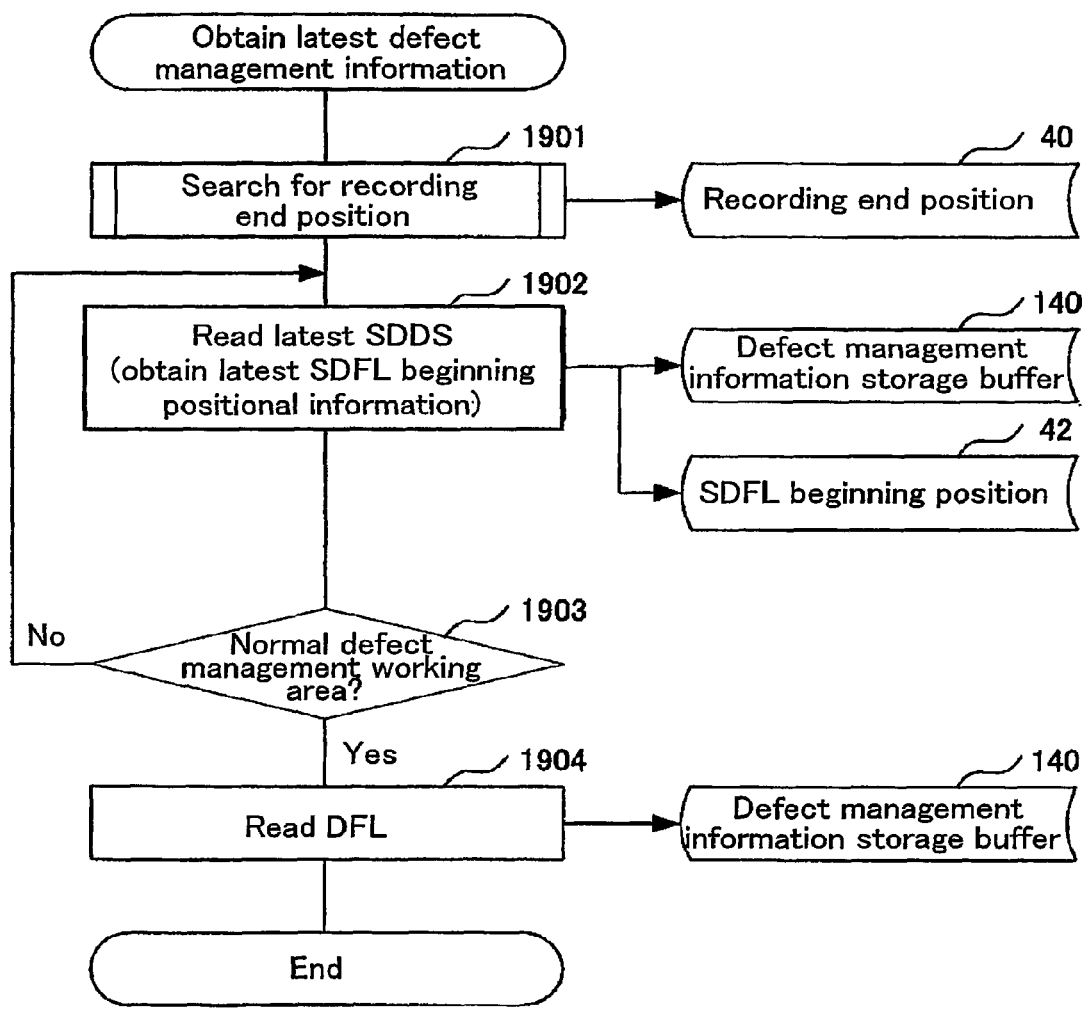
FIG. 20 is a flowchart of a procedure for obtaining a SDDS and a SDFL from the latest recorded defect management working area among defect management working areas contained in a temporary defect management area.

FIG. 20 shows a procedure for obtaining a SDDS 19 and a SDFL 18 from the latest recorded defect management working area 21 among the defect management working areas 21 contained in the temporary defect management area 20. Hereinafter, this procedure will be described step by step with reference to FIG. 20.

Step 1901: the defect management working information reading section 165 searches for the position of a border between a recorded defect management working area and an unrecorded defect management working area to obtain border positional information indicating the border position.

For example, the defect management working information reading section 165 searches the recording end position of the temporary defect management area 20 and stores the position of a defect management working area 21 located at the recording end position into the defect management information control memory 163 at the recording end position 40. After the position of the defect management working area 21 at the recording end position is stored, the process goes to step 1902.

Note that a procedure for searching for the recording end position is the same as the procedure described in Embodiment 1 of the present invention with reference to FIGS. 6 and 7 and the description is omitted.

Step 1902: the defect management working information reading section 165 reproduces a SDDS 19 from a block contained in a recorded defect management working area neighboring a border based on border positional information, and based on the reproduced SDDS 19, obtains positional information about a SDFL 18.

For example, the defect management working information reading section 165 reads out a SDDS 19 having a fixed length located at a predetermined position in a block which ends at the recording end position 40 into the defect management information storage buffer 140, and stores all subsidiary defect list beginning positional information 34 in the SDDS 19 into the defect management information control memory 163 at a SDFL beginning position 42. After all subsidiary defect list beginning positional information 34 in the SDDS 19 is stored, the process goes to step 1903.

Step 1903: the defect management working information reading section 165 determines whether or not a recorded defect management working area is an area in which recording has been normally completed, based on positional information about a SDFL 18 contained in a SDDS 19.

For example, the defect management working information reading section 165 uses positional information about the SDFL beginning position 42 to determine whether or not a DMWA containing a SDDS 19 in which reading has been performed is a normal defect management working area.

For example, by comparing positional information about a SDFL 18 with positional information about a border between a recorded defect management working area and an unrecorded defect management working area, the defect management working information reading section 165 determines whether or not the recorded defect management working area is an area in which recording has been normally completed.

Specifically, for example, if no address greater than the recording end position 40 is present in the positional information about the SDFL beginning position 42, a DMWA to be read out is determined to be normal. If an address greater than the recording end position 40 is present, a DMWA to be read out is determined to be abnormal.

Note that the above-described determination method is only illustrative. A method for determining whether or not a DMWA is normal is not limited to this.

If a recorded defect management working area is an area in which recording has not been completed normally, the position of a border between a recorded defect management working area neighboring the border and a recorded defect management working area neighboring the recorded defect management working area is searched for based on positional information about a SDFL 18.

For example, if a DMWA to be read out is determined to be abnormal, a normal DMWA which is present immediately before a current DMWA to be read out in a direction toward the beginning of the temporary defect management area 20, i.e., a DMWA whose end is located immediately before the SDFL beginning position 42, indicating the subsidiary defect list #1 beginning positional information 34, is read out.

A DMWA from which data is currently being read is determined to be abnormal, for example, when a DMWA which has not been completely updated since, for example, the optical disc recording/reproduction apparatus 100 had been shut down during updating of the DMWA or when the DMWA has a defect, such as a scar, a fingerprint, or the like.

If a DMWA is determined to be a normal defect management working area, the process goes to step 1904.

If a DMWA is determined to be not a normal defect management working area, the process goes to step 1902.

Step 1904: the defect management working information reading section 165 reproduces a SDFL 18 from each of a plurality of blocks contained in a recorded defect management working area neighboring a border, based on positional information about the SDFL 18.

For example, the defect management working information reading section 165 reads out all SDFLs 18 located beginning from the SDFL beginning position 42 into the defect management information storage buffer 140.

Here, if the recording end position 40 indicates that no temporary defect management area 20 has been recorded, no reading has to be performed in step 1902, step 1903 and step 1904. Instead of reading, a DDS 14 and a defect list 15 may be stored in the defect management information storage buffer 140 in advance. Note that the stored DDS 14 contains the defect list beginning positional information 30 which has been initialized to a predetermined value, and in the stored defect list 15, the number of defect entries in the defect list header 32 has been initialized (the number of defect entries=0), i.e., the stored defect list 15 has no defect entry 33.

Note that the defect management information storage buffer 140 may retain all SDFLs 18, which have been read out, as a combination which forms a DFL 15 or as they are. In Embodiment 2 of the present invention, all SDFLs 18, which have been readout, are combined into a DFL 15 and are retained.

In Embodiment 2 of FIG. 20, step 1901 corresponds to "searching for the position of a border between a recorded disc management working area and an unrecorded disc management working area to obtain border positional information indicating the border position", step 1902 corresponds to "reproducing a disc definition structure from a recorded disc management working area neighboring the border, based on the border positional information" and "obtaining positional information about partial disc management information, based on the disc definition structure", and step 1904 corresponds to "reproducing partial disc management information from each of a plurality of blocks contained in the recorded disc management working area neighboring the border, based on positional information about the partial disc management information".

However, a procedure for obtaining a SDDS 19 and a SDFL 18 from the latest recorded defect management working area 21 among the defect management working areas 21 contained in the temporary defect management area 20 is not limited to that of FIG. 20. Any procedure for obtaining a SDDS 19 and a SDFL 18 from the latest recorded defect management working area 21 among the defect management working areas 21 contained in the temporary defect management area 20 may be employed as long as it has functions of "searching for the position of a border between a recorded disc management working area and an unrecorded disc management working area to obtain border positional information indicating the border position", "reproducing a disc definition structure from a recorded disc management working area neighboring the border, based on the border positional information" and "obtaining positional information relating partial disc management information, based on the disc definition structure", and "reproducing partial disc management information from each of a plurality of blocks contained in the recorded disc management working area neighboring the border, based on positional information about the partial disc management information".

Thus, according to the present invention, by locating a SDDS containing positional information about a SDFL at a predetermined position in all blocks contained in a DMWA, it is possible to easily determine, from information in the SDDS, whether or not the DMWA has been normally updated.

Even if updating of the DMWA has failed, positional information of a normal DMWA present immediately before that DMWA can be easily calculated.

2.4. Update of Defect Management Information

A method for recording information (SDFL and SDDS) onto the write-once read-many optical disc 300 according to Embodiment 2 of the present invention will be described below.

Figure 21:
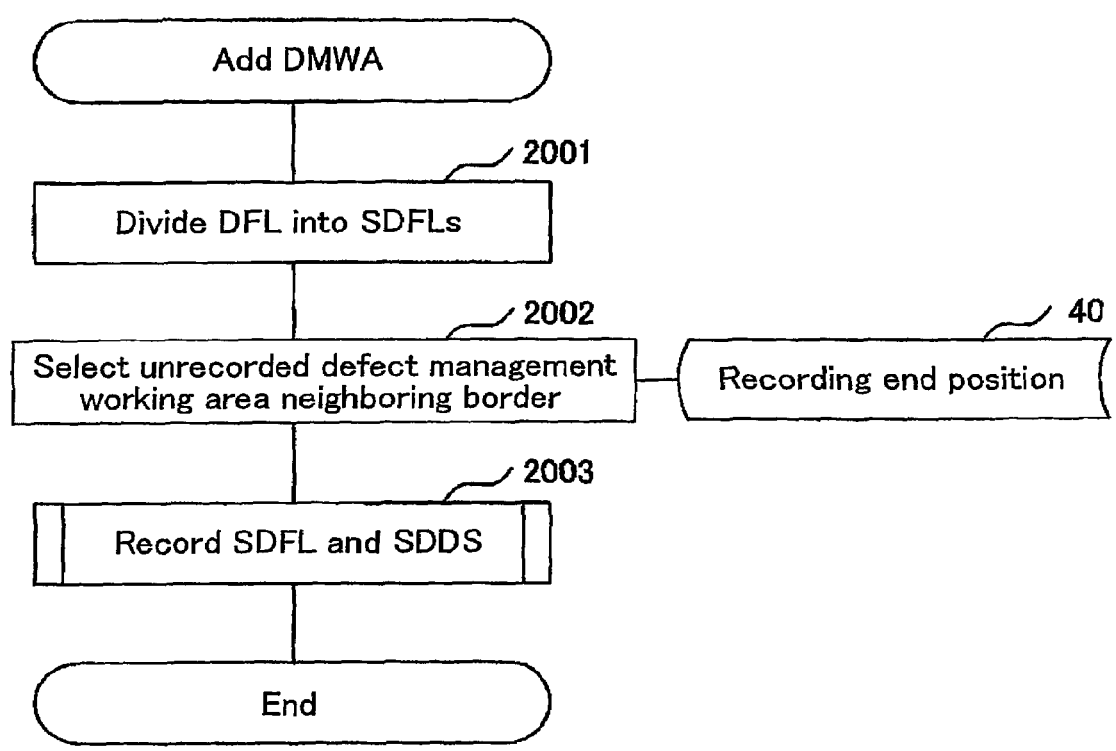
FIG. 21 is a flowchart showing a procedure for additionally recording a SDFL and a SDDS into a defect management working area in a write-once read-many optical disc according to Embodiment 2 of the present invention.

FIG. 21 shows a procedure for additionally recording a SDFL 18 and a SDDS 19 into a defect management working area 21 of the write-once read-many optical disc 300 according to Embodiment 2 of the present invention.

The defect management working information writing section 166 additionally records a SDFL 18 and a SDDS 19 into a defect management working area 21.

Here, the contents of a defect list 15 stored in the defect management information storage buffer 140 is permitted by the defect management information updating section 164 to retain the latest contents.

Specifically, for example, if a defect block is newly detected, the defect management information updating section 164 adds a defect entry corresponding to a new replacement block (i.e., a new defect block) to the defect list 15 stored in the defect management information storage buffer 140, and sorts defect entries in accordance with positional information about the defect block contained in the defect entry. Further, the defect management information updating section 164 increases the number of defect entries in a defect list header by one.

Hereinafter, a procedure for additionally recording a SDFL 18 and a SDDS 19 into a defect management working area 21 of the write-once read-many optical disc 300 according to Embodiment 2 of the present invention will be described step by step with reference to FIG. 21.

Step 2001: the defect management information updating section 164 calculates the size of the latest DFL 15 stored in the defect management information storage buffer 140 and determines whether or not the addition of the size of a SDDS 19 (fixed size) and the size of the latest DFL 15 exceeds the size of 1 block.

If the size of the addition exceeds the size of 1 block, the DFL 15 is divided into a plurality of subsidiary defect lists 18.

If the size of the addition is smaller than or equal to the size of 1 block, the DFL 15 itself is defined as a subsidiary defect list 18#1.

The size of a subsidiary defect list 18 is determined so that the maximum size of the addition of the size of a subsidiary defect list 18 and the size of a SDDS 19 (fixed size) is the size of 1 block.

Specifically, it is now assumed that the optical disc 300 is a DVD-RAM and the size of 1 block is 1 ECC block (=16 sectors) which is a unit for error correction. If the size of a SDDS 19 is 1 sector, the size of a subsidiary defect list 18 is 15 sectors at maximum.

Step 2002: the defect management information updating section 164 selects an unrecorded defect management working area neighboring a border between a recorded defect management working area and the unrecorded defect management working area.

For example, the defect management information updating section 164 selects an unrecorded defect management working area located at the beginning of a plurality of unrecorded defect management working areas by updating a SDDS 19 contained in the defect management information storage buffer 140 defect management information control memory 163 where a position obtained by adds to one the recording end position 40, i.e., the beginning position of an unrecorded area is regarded as the subsidiary defect list #1 beginning positional information 34. If there are M subsidiary defect lists 18 (M is an integer of 2 or more), subsidiary defect list beginning positional information 34 corresponding to each subsidiary defect list 18 contained in a SDDS 19 is updated.

Here, subsidiary defect list #2 beginning positional information, . . . , and subsidiary defect list #M beginning positional information can be calculated using the subsidiary defect list #1 beginning positional information and the block size. Specifically, for example, the subsidiary defect list #2 beginning positional information can be calculated as a position obtained by adding to 1 block size to a position indicated by the subsidiary defect list #1 beginning positional information.

Step 2003: the defect management working information writing section 166 records a SDFL 18 contained in a defect list 15, which is management information about a write-once read-many optical disc, and a SDDS 19 containing positional information about the SDFL 18, into each of a plurality of blocks contained in the unrecorded defect management working area neighboring the border.

For example, the defect management working information writing section 166 records an updated SDFL 18 and an updated SDDS 19 contained in the defect management information storage buffer 140 into the unrecorded area from the beginning position. If there are M SDFLs 18, M updated SDFLs 18 and M updated SDDSs 19 are recorded.

Here, when a SDDS 19 contains subsidiary defect list beginning positional information 34 for all SDFLs 18, the contents of the SDDSs 19 recorded along with the SDFLs 18 are the same for all the SDFLs 18. However, for example, if a SDDS 19 contains subsidiary defect list beginning positional information 34 about a beginning SDFL 18, subsidiary defect list beginning positional information 34 about an end SDFL 18, and subsidiary defect list beginning positional information 34 about SDFL(S) 18 contained in the same block, only the subsidiary defect list beginning positional information 34 about SDFL(s) 18 contained in the same block have different contents.

Also in Embodiment 2 of the present invention, a SDFL 18 and a SDDS 19 can be recorded while determining whether or not recording has been performed normally as in Embodiment 1 of the present invention described in FIG. 10. In Embodiment 2 of the present invention, when a SDFL 18 and a SDDS 19 can be recorded while determining whether or not recording has been normally performed, step 2003 is repeatedly performed until the SDFL 18 and the SDDS 19 are normally recorded.

As in Embodiment 1 of the present invention described in FIG. 10, when a DMWA is updated while determining whether or not recording has been normally performed, if a defect block is encountered during the process, it is possible that subsidiary defect list beginning positional information 34 indicated by a SDDS 19 in a previously recorded block does not match a position at which a subsidiary defect list 18 is actually recorded. However, in this case, by updating the contents of the SDDS 19 in the defect management information storage buffer 140 so that the contents of the SDDS 19 contained in the latest recorded block (i.e., a block located at the recording end position) are correct, matching can be achieved, thereby making it possible to avoid the above-described problem.

With the above-described procedure, the defect management working information writing section 166 can record the latest defect list 15 and DDS 14 into a defect management working area 21 contained in the temporary defect management area 20.

In Embodiment 2 of FIG. 21, step 2002 corresponds to "selecting an unrecorded disc management working area neighboring a border between a recorded disc management working area and the unrecorded disc management working area", step 2003 corresponds to "recording partial disc management information contained in disc management information, which is management information about a write-once read-many information recording medium, into each of a plurality of blocks contained in the unrecorded disc management working area neighboring the border" and "recording a disc definition structure contained in positional information about partial disc management information into each of a plurality of blocks contained in the unrecorded disc management working area border neighboring the border".

However, a procedure for additionally recording a SDFL 18 and a SDDS 19 into a defect management working area 21 of the write-once read-many optical disc 300 according to Embodiment 2 of the present invention is not limited to that of FIG. 21. Any procedure for additionally recording a SDFL 18 and a SDDS 19 into a defect management working area 21 of the write-once read-many optical disc 300 according to Embodiment 2 of the present invention can be employed as long as it has functions of "selecting an unrecorded disc management working area neighboring a border between a recorded disc management working area and the unrecorded disc management working area", "recording partial disc management information contained in disc management information, which is management information about a write-once read-many information recording medium, into each of a plurality of blocks contained in the unrecorded disc management working area neighboring the border" and "recording a disc definition structure contained in positional information about partial disc management information into each of a plurality of blocks contained in the unrecorded disc management working area border neighboring the border".

2.5. Finalization

A finalization procedure according to Embodiment 2 of the present invention is the same as the finalization procedure according to Embodiment 1 of the present invention and the description is omitted. In the finalization procedure according to Embodiment 2 of the present invention, subsidiary defect list beginning positional information 34 contained in a SDDS 19 of Embodiment 2 of the present invention substitutes for defect list beginning positional information 30 contained in a DDS 14 of Embodiment 1 of the present invention and the finalization procedure of Embodiment 1 of the present invention is performed.

2.6. Finalization Determination

A finalization determination procedure according to Embodiment 2 of the present invention is the same as the finalization determination procedure according to Embodiment 1 of the present invention and the description is omitted.

Thus, according to the present invention, even when update of a defect management working area 21 is incomplete since the power is cut or the like, it is correctly determined that update has failed. Therefore, it is possible to easily find the beginning position of a defect management working area 21 in which update has failed. Therefore, it is possible to easily obtain a defect list 15 in the latest normal defect management working area 21.

In Embodiment 2 of the present invention, a block which is a unit of error correction is described as a unit of reproduction/recording and defect management. Alternatively, for example, a sector which is the smallest addressable unit (1 sector has a size of 2 KBytes) may be used as a unit of reproduction/recording and defect management. It will be clearly appreciated that such variations and modifications may be made without departing from the spirit and scope of the present invention.

Although a defect list 15 or a subsidiary defect list 18 (i.e., child information) and a DDS 14 or a SDDS 19 (i.e., parent information) containing positional information about the defect list 15 or the subsidiary defect list 18 are provided in a defect management working area 21 in Embodiments 1 and 2 of the present invention, information provided is not limited to a defect list 15 or a subsidiary defect list 18 and a DDS 14 or a SDDS 19.

For example, when the information provided is disc management information, which is management information about a disc, and a disc definition structure containing positional information about the disc management information, at least one defect management working area is allocated sequentially in a predetermined direction. When the latest disc management information and the latest disc definition structure are located in this order along the predetermined direction in a recorded disc management working area neighboring a border between the recorded disc management working area and an unrecorded defect management working area, it is possible to easily search for the latest disc management information. Thus, the effect of the present invention can be obtained.

For example, the information provided may be a replacement list and a DDS containing positional information about the replacement list. The replacement list contains correspondence relationship information indicating a correspondence relationship between an area (replacement source) contained in a data area and an area (replacement destination) contained in a spare area.

In Embodiments 1 and 2 of the present invention, a defect management working area 21 contains a defect list 15 or a subsidiary defect list 18 (i.e., child information) and a DDS 14 or a SDDS 19 (i.e., parent information) containing positional information about the defect list 15. However, the number of pieces of child information is not limited to one as long as the parent information contains positional information about the child information. A plurality of pieces of child information may be present in a defect management working area 21. In other words, parent information may contain positional information about a plurality of pieces of child information. The plurality of pieces of child information may not be necessarily of the same type.

Figure 22:
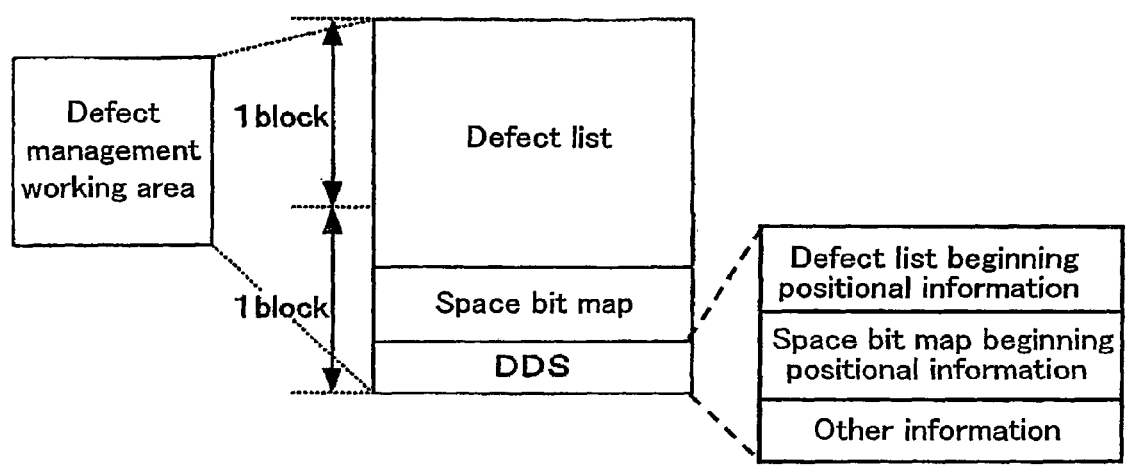
FIG. 22 is a diagram showing an exemplary defect management working area in which a space bit map information and a defect list are provided as child information.
Figure 23:
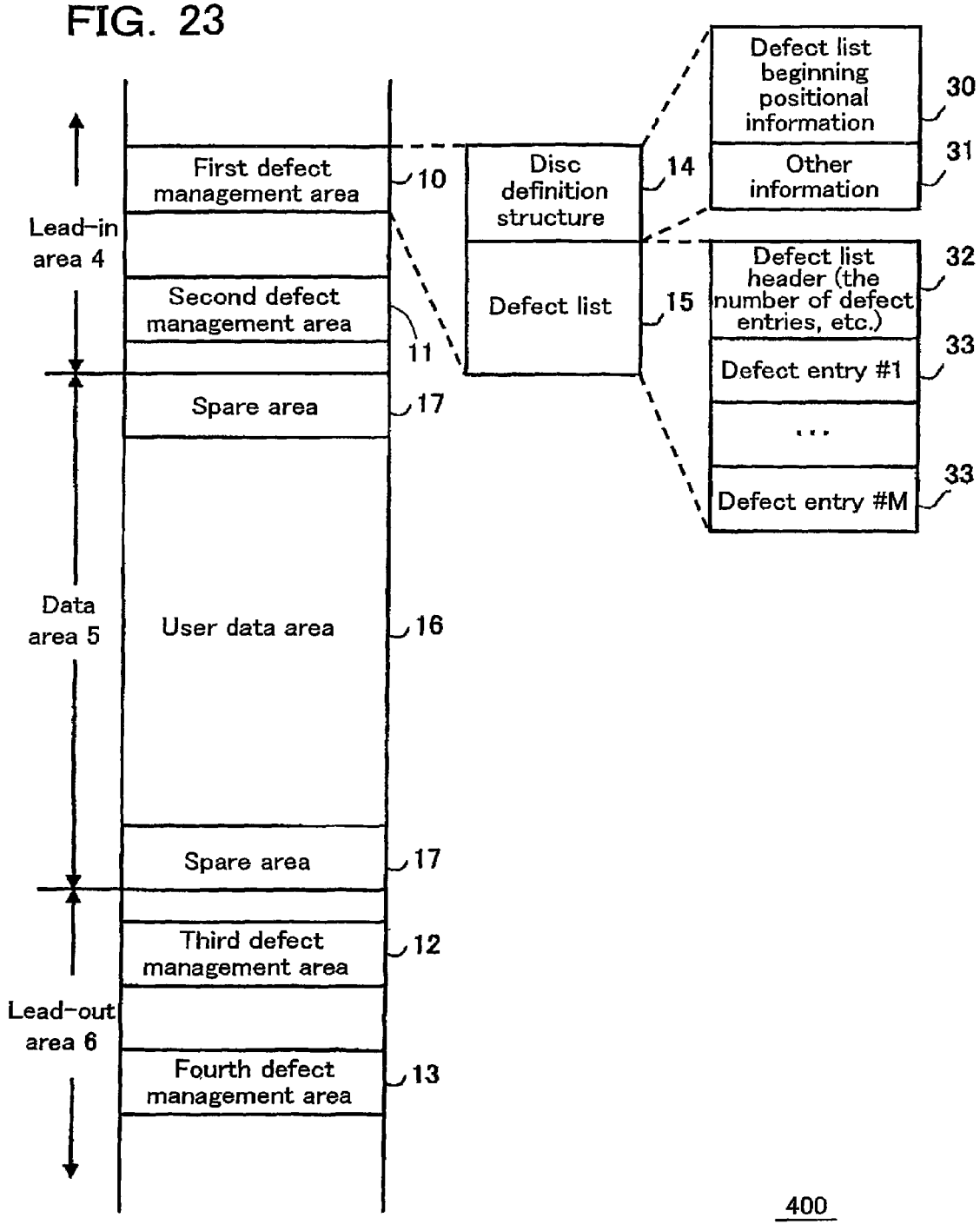
FIG. 23 is a diagram showing the data structure of a conventional rewritable optical disc.

FIG. 22 shows an exemplary defect management working area in which a space bit map information and a defect list are provided as child information.

In a defect management working area 21, space bit map information and a defect list are provided as child information. A DDS (parent information) may contain positional information about these two pieces of child information. In this case, if a DDS indicating positional information about child information (i.e., parent information) is located at a predetermined position which can be calculated based on a border between a recorded defect management working area and an unrecorded defect management working area (the end of the recorded defect management working area or the beginning of the recorded defect management working area), it is possible to easily find the latest child information. Thus, the effect of the present invention can be obtained.

When a defect block is present in a recorded defect management working area 21 as described with reference to FIGS. 10 and 11, if a recording end position is only searched for by the procedure described in FIGS. 6 and 7, it is possible that a defect block is incorrectly determined to be an unrecorded area. Therefore, recording end positional information obtained by the procedure described in FIGS. 6 and 7 is compared with retained information to determine whether or not the recording end positional information is the beginning position of an appropriate unrecorded area, for example. Thus, erroneous determination can be avoided. Here, the retained information means recording end positional information (LRA) made in the previous recording of a temporary defect management area 20, positional information about a defect block, or the like, which is retained at a predetermined position on a medium or a memory (nonvolatile) in an optical disc recording/reproduction apparatus, for example.

In the foregoing description of the present invention, a write-once read-many optical disc is employed as an information recording medium. However, an information recording medium is not limited to a write-once read-many optical disc. Any write-once read-many information recording medium may be employed, and in this case, the same effect as that of the above-described embodiments of the present invention can be obtained.

According to an aspect of the present invention, there is provided a finalization determination method for determining whether or not a write-once read-many information recording medium is already finalized, wherein:

at least one disc management working area is allocated on the write-once read-many information recording medium;

the finalization determination method comprising the steps of:

(a) determining whether or not a finalization identifying flag is recorded on the write-once read-many information recording medium, the finalization identifying flag indicating prohibition of additional recording data into the at least one disc management working area; and (b) determining, based on a result of the step (a), whether or not the write-once read-many information recording medium is changed from a write-once read-many state to a non-write-once read-many state.

In one embodiment of this invention, in the at least one disc management working area, disc management information, which is management information about the write-once read-many information recording medium, and a disc definition structure containing positional information about the disc management information, are provided; and the step (a) comprises determining whether or not the finalization identifying flag is recorded in at least one of the disc definition structure and the disc management information.

According to another aspect of the present invention, there is provided a finalization determination method for determining whether or not a write-once read-many information recording medium is already finalized, wherein:

at least one disc management working area and at least one disc management area are allocated on the write-once read-many information recording medium;

in the at least one disc management working area, disc management information, which is management information about the write-once read-many information recording medium, and a disc definition structure containing positional information about the disc management information, are recorded; and the finalization determination method comprising the steps of:

(a) reading data from one of the at least one disc management areas and determining whether or not the one of the at least one disc management areas is recorded; and (b) determining, based on a result of the step (a), whether or not the write-once read-many information recording medium is changed from a write-once read-many state to a non-write-once read-many state.

In one embodiment of this invention, the step (a) comprises determining whether or not the one of the at least one disc management areas is recorded, depending on an amplitude of a read signal indicating a result of the reading of the data.

In one embodiment of this invention, the step (a) comprises determining whether or not the one of the at least one disc management areas is recorded, depending on whether or not the data is correctly read out.

In one embodiment of this invention, the step (a) comprises reading data from one of the at least one disc management areas, and based on a result of the reading of the data, determining whether or not last disc management information and last disc definition structure are recorded in the at least one disc management area;

the last disc management information is a latest disc management information provided in the at least one disc management area;

the last disc definition structure is a disc definition structure containing positional information about the last disc management information; and the latest disc management information is disc management information recorded in a recorded disc management working area neighboring a border between the recorded disc management working area and an unrecorded disc management working area.

In one embodiment of this invention, the step (a) comprises determining whether or not the one of the at least one disc management areas is recorded, based on whether or not the last disc management information or the last disc definition structure is correctly read out;

the last disc management information is latest disc management information provided in the at least one disc management area;

the last disc definition structure is a disc definition structure containing positional information about the last disc management information; and the latest disc management information is disc management information recorded in a recorded disc management working area neighboring a border between the recorded disc management working area and an unrecorded disc management working area.

In one embodiment of this invention, the step (a) comprises reading data from each of the at least one disc management area and determining whether or not each of the at least one disc management area is recorded; and the step (b) comprises determining that the write-once read-many information recording medium is changed from a write-once read-many state to a non-write-once read-many state when it is determined that at least one of the at least one disc management areas is recorded, and determines that the write-once read-many information recording medium is not changed from a write-once read-many state to a non-write-once read-many state when all of the at least one disc management areas are unrecorded.

In one embodiment of this invention, the disc management area is a defect management area for recording management information about a defect area.

According to another aspect of the present invention, there is provided a finalization determination apparatus for determining whether or not a write-once read-many information recording medium is already finalized, wherein:

at least one disc management working area is allocated on the write-once read-many information recording medium;

the finalization determination apparatus comprising:

(a) a section for determining whether or not a finalization identifying flag is recorded on the write-once read-many information recording medium, the finalization identifying flag indicating prohibition of additional recording data into the at least one disc management working area; and (b) a section for determining, based on a result of determination by the section (a), whether or not the write-once read-many information recording medium is changed from a write-once read-many state to a non-write-once read-many state.

In one embodiment of this invention, in the at least one disc management working area, disc management information, which is management information about the write-once read-many information recording medium, and a disc definition structure containing positional information about the disc management information, are provided; and the section (a) comprises a section for determining whether or not the finalization identifying flag is recorded in at least one of the disc definition structure and the disc management information.

According to another aspect of the present invention, there is provided a finalization determination apparatus for determining whether or not a write-once read-many information recording medium is already finalized, wherein:

at least one disc management working area and at least one disc management area are allocated on the write-once read-many information recording medium;

in the at least one disc management working area, disc management information, which is management information about the write-once read-many information recording medium, and a disc definition structure containing positional information about the disc management information, are recorded; and the finalization determination apparatus comprising:

(a) a section for reading data from one of the at least one disc management areas and determining whether or not the one of the at least one disc management areas is recorded; and (b) a section for determining, based on a result of determination by the section (a), whether or not the write-once read-many information recording medium is changed from a write-once read-many state to a non-write-once read-many state.

In one embodiment of this invention, the section (a) comprises a section for determining whether or not the one of the at least one disc management areas is recorded, depending on an amplitude of a read signal indicating a result of the reading of the data.

In one embodiment of this invention, the section (a) comprises a section for determining whether or not the one of the at least one disc management areas is recorded, depending on whether or not the data is correctly read out.

In one embodiment of this invention, the section (a) comprises a section for reading data from one of the at least one disc management areas, and based on a result of the reading of the data, determining whether or not last disc management information and last disc definition structure are recorded in the at least one disc management area;

the last disc management information is a latest disc management information provided in the at least one disc management area;

the last disc definition structure is a disc definition structure containing positional information about the last disc management information; and the latest disc management information is disc management information recorded in a recorded disc management working area neighboring a border between the recorded disc management working area and an unrecorded disc management working area.

In one embodiment of this invention, the section (a) comprises a section for determining whether or not the one of the at least one disc management areas is recorded, based on whether or not the last disc management information or the last disc definition structure is correctly read out;

the last disc management information is latest disc management information provided in the at least one disc management area;

the last disc definition structure is a disc definition structure containing positional information about the last disc management information; and the latest disc management information is disc management information recorded in a recorded disc management working area neighboring a border between the recorded disc management working area and an unrecorded disc management working area.

In one embodiment of this invention, the section (a) comprises a section for reading data from each of the at least one disc management area and determining whether or not each of the at least one disc management area is recorded; and the section (b) comprises a section for determining that the write-once read-many information recording medium is changed from a write-once read-many state to a non-write-once read-many state when it is determined that at least one of the at least one disc management areas is recorded, and determines that the write-once read-many information recording medium is not changed from a write-once read-many state to a non-write-once read-many state when all of the at least one disc management areas are unrecorded.

In one embodiment of this invention, the disc management area is a defect management area for recording management information about a defect area.

According to another aspect of the present invention, there is provided a finalization method for finalizing a write-once read-many information recording medium, wherein:

at least one disc management working area is allocated on the write-once read-many information recording medium; and the finalization method comprising the steps of:

(a) recording a finalization identifying flag onto the write-once read-many information recording medium, the finalization identifying flag indicating prohibition of additional recording data into the at least one disc management working area.

In one embodiment of this invention, in the at least one disc management working area, disc management information, which is management information about the write-once read-many information recording medium, and a disc definition structure containing positional information about the disc management information, are provided; and the step (a) comprises recording the finalization identifying flag into at least one of the disc definition structure and the disc management information.

According to another aspect of the present invention, there is provided a finalization method for finalizing a write-once read-many information recording medium, wherein:

at least one disc management working area and at least one disc management area are allocated on the write-once read-many information recording medium;

in the at least one disc management working area, disc management information, which is management information about the write-once read-many information recording medium, and a disc definition structure containing positional information about the disc management information, are recorded; and the finalization method comprising the steps of:

(a) recording last disc management information into one of the at least one disc management areas; and (b) recording, based on the last disc management information, a last disc definition structure into the one of the at least one disc management areas;

the last disc management information is a latest disc management information provided in the at least one disc management area;

the last disc definition structure is a disc definition structure containing positional information about the last disc management information;

the latest disc management information is disc management information recorded in a recorded disc management working area neighboring a border between the recorded disc management working area and an unrecorded disc management working area.

In one embodiment of this invention, the finalization method further comprises changing latest disc definition structure to the last disc definition structure by changing positional information indicating a position of the recorded disc management working area neighboring the border to positional information indicating a position of one of the at least one disc management areas, wherein the latest disc definition structure includes positional information about the latest disc management information.

In one embodiment of this invention, the finalization method further comprises repeating the step (a) and the step (b) for each of the at least one disc management area to record the last disc management information and the last disc definition structure into all of the at least one disc management area.

According to another aspect of the present invention, there is provided a finalization apparatus for finalizing a write-once read-many information recording medium, wherein:

at least one disc management working area is allocated on the write-once read-many information recording medium; and the finalization apparatus comprising:

(a) a section for recording a finalization identifying flag onto the write-once read-many information recording medium, the finalization identifying flag indicating prohibition of additional recording data into the at least one disc management working area.

In one embodiment of this invention, in the at least one disc management working area, disc management information, which is management information about the write-once read-many information recording medium, and a disc definition structure containing positional information about the disc management information, are provided; and the section (a) comprises a section for recording the finalization identifying flag into at least one of the disc definition structure and the disc management information.

According to another aspect of the present invention, there is provided a finalization apparatus for finalizing a write-once read-many information recording medium, wherein:

at least one disc management working area and at least one disc management area are allocated on the write-once read-many information recording medium;

in the at least one disc management working area, disc management information, which is management information about the write-once read-many information recording medium, and a disc definition structure containing positional information about the disc management information, are recorded; and the finalization apparatus comprising:

(a) a section for recording last disc management information into one of the at least one disc management areas; and (b) a section for recording, based on the last disc management information, a last disc definition structure into the one of the at least one disc management areas;

the last disc management information is a latest disc management information provided in the at least one disc management area;

the last disc definition structure is a disc definition structure containing positional information about the last disc management information;

the latest disc management information is disc management information recorded in a recorded disc management working area neighboring a border between the recorded disc management working area and an unrecorded disc management working area.

In one embodiment of this invention, the finalization apparatus further comprises a section for changing latest disc definition structure to the last disc definition structure by changing positional information indicating a position of the recorded disc management working area neighboring the border to positional information indicating a position of one of the at least one disc management areas, wherein the latest disc definition structure includes positional information about the latest disc management information.

In one embodiment of this invention, the finalization method further comprises a section for repeatedly performing recording last disc management information into one of the at least one disc management areas, and recording, based on the last disc management information, a last disc definition structure into the one of the at least one disc management areas, for each of the at least one disc management area to record the last disc management information and the last disc definition structure into all of the at least one disc management area.

According to another aspect of the present invention, there is provided a write-once read-many information recording medium, wherein:

at least one disc management working area is sequentially allocated in a predetermined direction, the at least one disc management working area contains a plurality of blocks, each block being a unit for recording/reproducing data;

in each of the plurality of blocks, partial disc management information contained in disc management information, which is management information about the write-once read-many information recording medium, and a disc definition structure containing positional information about the partial disc management information, are provided; and the disc definition structure is provided at a predetermined position in each of the plurality of blocks.

In one embodiment of this invention, the partial disc management information and the disc definition structure are provided in each of a plurality of blocks contained in a recorded disc management area neighboring a border between the recorded disc management working area and an unrecorded disc management working area.

In one embodiment of this invention, the write-once read-many information recording medium contains a data area for recording data and a spare area, the spare area being a replacement area for the data area;

the disc management information contains a replacement list containing correspondence relationship information indicating a correspondence relationship between a replacement source area contained in the data area and a replacement destination area contained in the spare area; and in each of the plurality of blocks, a partial replacement list contained in the replacement list, and a disc definition structure containing positional information about the partial replacement list, are provided.

In one embodiment of this invention, the predetermined direction is a direction from an inner periphery to an outer periphery of the write-once read-many information recording medium.

In one embodiment of this invention, the predetermined direction is a direction from an outer periphery to an inner periphery of the write-once read-many information recording medium.

According to another aspect of the present invention, there is provided an information recording method for recording information onto a write-once read-many information recording medium, wherein:

at least one disc management working area is sequentially allocated in a predetermined direction on the write-once read-many information recording medium; and the information recording method comprising the steps of:

(a) selecting an unrecorded disc management working area neighboring a border between a recorded disc management working area and the unrecorded disc management working area;

(b) recording partial disc management information contained in disc management information, which is management information about the write-once read-many information recording medium, into each of a plurality of blocks contained in the unrecorded disc management working area neighboring the border; and (c) recording a disc definition structure containing positional information about the partial disc management information into each of a plurality of blocks contained in the unrecorded disc management working area neighboring the border;

each of the plurality of blocks is a unit for recording/reproducing data; and the disc definition structure is provided at a predetermined position in each of the plurality of blocks.

In one embodiment of this invention, the write-once read-many information recording medium contains a data area for recording data and a spare area, the spare area being a replacement area for the data area;

the disc management information contains a replacement list containing correspondence relationship information indicating a correspondence relationship between a replacement source area contained in the data area and a replacement destination area contained in the spare area;

in each of the plurality of blocks, a partial replacement list contained in the replacement list, and a disc definition structure containing positional information about the partial replacement list, are provided.

In one embodiment of this invention, the step (b) further comprises determining whether or not the recording of the partial disc management information has been normally performed;

the step (c) further comprises determining whether or not the recording of the disc definition structure has been normally performed; and the information recording method further comprises the step of:

(d) repeatedly performing the step (b) until the recording of the partial disc management information is normally performed, and repeatedly performing the step (c) until the recording of the disc definition structure is normally performed.

According to another aspect of the present invention, there is provided an information reproduction method for reproducing information from a write-once read-many information recording medium, wherein:

at least one disc management working area is sequentially allocated in a predetermined direction on the write-once read-many information recording medium;

the at least one disc management working area contains a plurality of blocks, each of the plurality of blocks being a unit for recording/reproducing data;

in each of the plurality of blocks, partial disc management information contained in disc management information, which is management information about the write-once read-many information recording medium, and a disc definition structure containing positional information about the partial disc management information, are provided;

the disc definition structure is provided at a predetermined position in each of the plurality of blocks; and the information reproduction method comprising the steps of:

(a) searching for a position of a border between a recorded disc management working area and an unrecorded disc management working area to obtain border positional information indicating the position of the border;

(b) reproducing the disc definition structure from the recorded disc management working area neighboring the border based on the border positional information;

(c) obtaining positional information about the partial disc management information based on the disc definition structure; and (d) reproducing the partial disc management information from each of a plurality of blocks contained in the recorded disc management working area neighboring the border based on the positional information about the partial disc management information.

In one embodiment of this invention, the write-once read-many information recording medium contains a data area for recording data and a spare area, the spare area being a replacement area for the data area;

the disc management information contains a replacement list containing correspondence relationship information indicating a correspondence relationship between a replacement source area contained in the data area and a replacement destination area contained in the spare area; and in each of the plurality of blocks, a partial replacement list contained in the replacement list, and a disc definition structure containing positional information about the partial replacement list, are provided.

In one embodiment of this invention, the step (c) further comprises the step of:

(e) determining whether or not the recorded disc management working area is an area in which the recording is normally completed, based on the positional information about the partial disc management information contained in the disc definition structure; and when it is determined that the recorded disc management working area is an area in which the recording is not normally completed, a position of a border between the recorded disc management working area neighboring the border and a recorded disc management working area neighboring the recorded disc management working area neighboring the border, is searched for based on the positional information about the partial disc management information.

In one embodiment of this invention, the step (e) comprises determining whether or not the recorded disc management working area is an area in which the recording is normally completed, by comparing the positional information about the partial disc management information with positional information about a border between the recorded disc management working area and an unrecorded disc management working area.

According to another aspect of the present invention, there is provided an information recording apparatus for recording information onto a write-once read-many information recording medium, wherein:

at least one disc management working area is sequentially allocated in a predetermined direction on the write-once read-many information recording medium; and the information recording apparatus comprising:

(a) a section for selecting an unrecorded disc management working area neighboring a border between a recorded disc management working area and the unrecorded disc management working area;

(b) a section for recording partial disc management information contained in disc management information, which is management information about the write-once read-many information recording medium, into each of a plurality of blocks contained in the unrecorded disc management working area neighboring the border; and (c) a section for recording a disc definition structure containing positional information about the partial disc management information into each of a plurality of blocks contained in the unrecorded disc management working area neighboring the border;

each of the plurality of blocks is a unit for recording/reproducing data; and the disc definition structure is provided at a predetermined position in each of the plurality of blocks.

In one embodiment of this invention, the write-once read-many information recording medium contains a data area for recording data and a spare area, the spare area being a replacement area for the data area;

the disc management information contains a replacement list containing correspondence relationship information indicating a correspondence relationship between a replacement source area contained in the data area and a replacement destination area contained in the spare area;

in each of the plurality of blocks, a partial replacement list contained in the replacement list, and a disc definition structure containing positional information about the partial replacement list, are provided.

In one embodiment of this invention, the section (b) further comprises a section for determining whether or not the recording of the partial disc management information has been normally performed;

the section (c) further comprises a section for determining whether or not the recording of the disc definition structure has been normally performed; and the information recording apparatus further comprises:

(d) a section for repeatedly performing recording of the partial disc management information until the recording of the partial disc management information is normally performed, and repeatedly performing recording of the disc definition structure until the recording of the disc definition structure is normally performed.

According to another aspect of the present invention, there is provided an information reproduction apparatus for reproducing information from a write-once read-many information recording medium, wherein:

at least one disc management working area is sequentially allocated in a predetermined direction on the write-once read-many information recording medium;

the at least one disc management working area contains a plurality of blocks, each of the plurality of blocks being a unit for recording/reproducing data;

in each of the plurality of blocks, partial disc management information contained in disc management information, which is management information about the write-once read-many information recording medium, and a disc definition structure containing positional information about the partial disc management information, are provided;

the disc definition structure is provided at a predetermined position in each of the plurality of blocks; and the information reproduction apparatus comprising:

(a) a section for searching for a position of a border between a recorded disc management working area and an unrecorded disc management working area to obtain border positional information indicating the position of the border;

(b) a section for reproducing the disc definition structure from the recorded disc management working area neighboring the border based on the border positional information;

(c) a section for obtaining positional information about the partial disc management information based on the disc definition structure; and (d) a section for reproducing the partial disc management information from each of a plurality of blocks contained in the recorded disc management working area neighboring the border based on the positional information about the partial disc management information.

In one embodiment of this invention, the write-once read-many information recording medium contains a data area for recording data and a spare area, the spare area being a replacement area for the data area;

the disc management information contains a replacement list containing correspondence relationship information indicating a correspondence relationship between a replacement source area contained in the data area and a replacement destination area contained in the spare area; and in each of the plurality of blocks, a partial replacement list contained in the replacement list, and a disc definition structure containing positional information about the partial replacement list, are provided.

In one embodiment of this invention, the section (c) further comprises:

(e) a section for determining whether or not the recorded disc management working area is an area in which the recording is normally completed, based on the positional information about the partial disc management information contained in the disc definition structure; and when it is determined that the recorded disc management working area is an area in which the recording is not normally completed, a position of a border between the recorded disc management working area neighboring the border and a recorded disc management working area neighboring the recorded disc management working area neighboring the border, is searched for based on the positional information about the partial disc management information.

In one embodiment of this invention, the section (e) comprises a section for determining whether or not the recorded disc management working area is an area in which the recording is normally completed, by comparing the positional information about the partial disc management information with positional information about a border between the recorded disc management working area and an unrecorded disc management working area.

Although certain preferred embodiments have been described herein, it is not intended that such embodiments be construed as limitations on the scope of the invention except as set forth in the appended claims. Various other modifications and equivalents will be apparent to and can be readily made by those skilled in the art, after reading the description herein, without departing from the scope and spirit of this invention. All patents, published patent applications and publications cited herein are incorporated by reference as if set forth fully herein.

INDUSTRIAL APPLICABILITY

In the write-once read-many information recording medium of the present invention, at least one defect management working area is sequentially allocated in a predetermined direction. The latest defect list and the latest DDS are provided in the predetermined direction in a recorded defect management working area neighboring a border between the recorded defect management working area and an unrecorded defect management working area, where the latest defect list precedes the latest DDS in the predetermined direction. Therefore, it is possible to easily find the latest DDS and the latest defect list.

By finalization, the data structure of a write-once read-many optical disc after finalization is the same as the data structure of are writable optical disc. As a result, data recorded on a finalized write-once read-many optical disc can be reproduced by a rewritable optical disc recording/reproduction apparatus, resulting in a compatible optical disc for reproduction.

A subsidiary disc definition structure (SDDS) is provided at a predetermined position in each of a plurality of blocks. Therefore, even when update of a defect management working area is incomplete since the power is cut or the like, it is correctly determined that update has failed. Therefore, it is possible to easily find the beginning position of a defect management working area in which update has failed. Therefore, it is possible to easily obtain a defect list in the latest normal defect management working area.

According to the information recording method of the present invention, even if a defect block is present in a defect management working area and therefore recording of a defect list and a DDS fails, recording of the defect list and the DDS can be repeatedly performed until recording of the defect list and the DDS is normally completed. Thus, a defect list and a DDS can be correctly recorded. As a result, the reliability of recording of a defect list and a DDS into a defect management working area can be improved.

The invention claim is:

1. An information recording medium, wherein:
at least one disc management working area is sequentially allocated in a predetermined direction;
in the at least one disc management working area, disc management information, which is management information about the information recording medium, and disc definition structure containing positional information about the disc management information, are provided;
latest disc management information and latest disc definition structure are provided, wherein the latest disc management information precedes the latest disc definition structure in the predetermined direction;
the latest disc management information is disc management information provided in a recorded disc management working area neighboring a border between the recorded disc management working area and an unrecorded disc management working area;
the latest disc definition structure is a disc definition structure containing positional information about the latest disc management information;
the latest disc definition structure is provided at a predetermined position in the recorded disc management working area neighboring the border, the predetermined position being capable of being calculated based on the border as a reference;
the information recording medium contains a data area for recording data and a spare area, the spare area being a replacement area for the data area;
the disc management information contains a replacement list containing correspondence relationship information indicating a correspondence relationship between a replacement source area contained in the data area and a replacement destination area contained in the spare area; and
the disc definition structure contains replacement list positional information which is positional information about the replacement list.

2. An information recording apparatus for recording information onto an information recording medium according to claim 1, the information recording apparatus comprising:
a section for recording the disc management information into an unrecorded disc management working area neighboring the border between the recorded disc management working area and the unrecorded disc management working area; and
a section for recording the disc definition structure into a predetermined position in the unrecorded disc management working area neighboring the border.

3. An information reproduction apparatus for reproducing information from an information recording medium according to claim 1, the information reproduction apparatus comprising:
a section for reproducing the latest disc definition structure; and
a section for reproducing the disc management information based on the latest disc definition structure.

* * * * *